United States Patent [19]
Gaa et al.

[11] Patent Number: 4,567,228
[45] Date of Patent: Jan. 28, 1986

[54] AQUEOUS DISPERSION, INTERNALLY SILYLATED AND DISPERSED POLYURETHANE RESINS, AND SURFACES CONTAINING SAME

[75] Inventors: Peter C. Gaa; David E. Dana, both of Pittsburgh, Pa.

[73] Assignee: PPG Industries, Inc., Pittsburgh, Pa.

[21] Appl. No.: 612,207

[22] Filed: May 21, 1984

[51] Int. Cl.$^4$ .............................................. C08G 18/38
[52] U.S. Cl. ................................... 524/588; 528/26; 528/28
[58] Field of Search ...................... 524/588; 528/26, 28

[56] References Cited

U.S. PATENT DOCUMENTS

| | | | |
|---|---|---|---|
| 2,968,575 | 1/1961 | Mallonnee | 528/67 |
| 3,479,310 | 11/1969 | Dieterich et al. | 528/66 |
| 3,522,142 | 7/1970 | Wismer et al. | 427/435 |
| 3,627,722 | 12/1971 | Seiter | 528/28 |
| 3,632,557 | 1/1972 | Brode et al. | 528/28 |
| 3,711,445 | 1/1973 | Chu et al. | 528/67 |
| 3,870,684 | 3/1975 | Witt et al. | 528/67 |
| 3,886,226 | 5/1975 | Asai et al. | 528/28 |
| 3,903,052 | 9/1975 | Wagner et al. | 428/420 |
| 3,905,929 | 9/1975 | Noll | 528/45 |
| 3,919,351 | 11/1975 | Chang et al. | 427/435 |
| 3,920,598 | 11/1975 | Reiff et al. | 528/67 |
| 3,935,146 | 1/1976 | Noll et al. | 428/473 |
| 3,940,542 | 2/1976 | Knopf et al. | 428/364 |
| 3,941,733 | 3/1976 | Chang | 428/304 |
| 3,947,426 | 3/1976 | Lander | 528/45 |
| 3,951,897 | 4/1976 | Matsuda et al. | 528/45 |
| 3,979,344 | 9/1976 | Bryant et al. | 428/442 |
| 4,031,120 | 6/1977 | Gervase | 428/420 |
| 4,046,729 | 9/1977 | Scriven et al. | 204/181 |
| 4,066,591 | 1/1978 | Scriven et al. | 428/262 |
| 4,067,844 | 1/1978 | Barron et al. | 528/28 |
| 4,092,286 | 5/1978 | Noll et al. | 428/424 |
| 4,093,673 | 6/1978 | Chang et al. | 427/435 |
| 4,146,585 | 3/1979 | Ward et al. | 526/320 |
| 4,147,679 | 4/1979 | Scriven et al. | 428/457 |
| 4,157,321 | 6/1979 | Kawakami et al. | 427/387 |
| 4,190,566 | 2/1980 | Noll et al. | 528/79 |
| 4,203,883 | 5/1980 | Hangauer, Jr. | 525/453 |
| 4,229,925 | 9/1980 | Bryant et al. | 528/49 |
| 4,237,264 | 12/1980 | Noll et al. | 528/67 |
| 4,238,378 | 12/1980 | Markusch et al. | 528/68 |
| 4,269,748 | 5/1981 | Nachtkamp et al. | 428/423.1 |
| 4,271,229 | 6/1981 | Temple | 428/447 |
| 4,289,672 | 9/1981 | Friederich et al. | 428/378 |
| 4,292,226 | 9/1981 | Wenzel et al. | 428/423.4 |
| 4,293,474 | 10/1981 | Dieterich et al. | 528/67 |
| 4,293,679 | 10/1981 | Cogliano | 528/48 |
| 4,303,774 | 12/1981 | Nachtkamp et al. | 521/174 |
| 4,345,053 | 8/1982 | Rizk et al. | 525/440 |
| 4,374,237 | 2/1983 | Berger et al. | 528/28 |
| 4,408,008 | 10/1983 | Markusch | 524/491 |
| 4,413,086 | 11/1983 | Chang et al. | 525/480 |
| 4,430,486 | 2/1984 | Chang et al. | 525/453 |

FOREIGN PATENT DOCUMENTS 1143309  4/1967  United Kingdom .

OTHER PUBLICATIONS

Silane Coupling Agents, by Edwin P. Plueddemann, Plenum Press, New York.
Aqueous Emulsions, Dispersions and Solutions of Polyurethanes; Synthesis and Properties, by D. Dieterich, Progress in Organic Coatings, Elsevier 1981.

Primary Examiner—Maurice J. Welsh
Attorney, Agent, or Firm—Kenneth J. Stachel

[57] ABSTRACT

An aqueous dispersible, isocyanate-containing polymer or prepolymer or chain extended polymer is provided which has internal pendant, reactable silane groups and which can also have internal dispersing aids. The aqueous dispersible, isocyanate-containing polymer, prepolymer, or chain extended polymer produces an aqueous dispersion of a polyurethane polymer having pendant reactable siliconate anions. The isocyanate-containing polymer is prepared from polyisocyanates, organic compounds with at least 2 active hydrogens, and organosilane which is at least monofunctional in reaction with isocyanate groups on at least one organic moiety of the organosilane. The organosilane also may have hydrolyzed or hydrolyzable groups associated with the silicone atom. The prepolymer is formed at temperatures less than 200° C. at atmospheric pressure in a one shot or two step process. The polymer is combined with water to form an oil-in-water dispersion, and, if it is a prepolymer, the molecular weight is increased through chain extension. The pH of the aqueous dispersion of the polyurethane is maintained at least around 7 when the silyl concentration of the polymer is greater than 0.1 weight percent of the water in the dispersion. The aqueous dispersion can also be prepared from a prepolymer that is devoid of any organosilane used as a comonomer and where the prepolymer is dispersed and chain-extended with the difunctional organo silane. The aqueous dispersion of the polyurethane resin is used in coating myriad substrates such as inorganic oxide substrates.

36 Claims, No Drawings

AQUEOUS DISPERSION, INTERNALLY SILYLATED AND DISPERSED POLYURETHANE RESINS, AND SURFACES CONTAINING SAME

The present invention is directed to water dispersible, ungelled, silylated polyurethane resins, and the aqueous dispersions of these ungelled, silylated polyurethane resins, and surfaces treated with the aqueous dispersions.

More particularly, the present invention is directed to water dispersible, ungelled, emulsified polyurethane resins having silyl groups and aqueous dispersions of the water dispersible or emulsifiable, ungelled, silylated polyurethane for use as an adhesion promoter, as a coating, as a film former for treating organic or inorganic substrates and as a curable adhesive.

Polyurethane resins, which include both the polyurethane polymers and polyurethane-urea polymers, have found extensive use as adhesion promoters and film forming polymers. For example, such polymeric materials have been used for coating and for impregnating woven and nonwoven textiles, leather, paper, wood, metals, ceramics, stone, concrete, bitumen, rigid fibers, straw, glass, porcelain, plastics of a variety of different types, and glass fibers, and for antistatic and crease-resistant finishing of paper-like materials and the like. The polyurethane polymers have been applied to the substrates either in the neat form or from solvent solutions as one or two part systems and more recently from aqueous dispersions. The aqueous dispersions or pastes of the polymers have been applied to porous substrates such as mats, felts or non-woven webs, foam sheets and split leather and to smooth porous or nonporous materials such as metal, glass paper, cardboard, ceramic materials, sheet steel, silicon rubber, aluminum foil and the like.

Some polyurethane polymers have been modified to improve or add to their basic properties. For instance, end-capping a polyurethane with some chemical group can provide for specific reactions of the polymer with additional monomers or other chemical compounds. For example, polyurethane has been end-capped with groups such as primary and secondary aliphatic amino silanes to allow for siloxane cross-linking to assist in curing. End-capped polyurethane polymers have been used as silanol-containing urethane polymers, where the silanol groups are terminal and mutually interactive to promote cross-linking through siloxane bonding.

Polyurethane polymers end-capped for siloxane bonding have been used with organic systems including some systems utilizing self-priming polyurethane polymers having amine alkoxy silanes. The functional amine alkoxy silanes are incorporated into the polyurethane during the prepolymerization of the isocyanate backbone of the polyurethane polymer composition. In these organic systems, relatively small amounts of unhydrolyzed alkoxy silanes have been incorporated into the polyurethane polymer. The polyurethane polymer applied from the organic system shows good adhesion to glass and aluminum. Although the high viscosities of polyurethane polymers make it difficult to avoid the use of organic systems, the application of the alkoxy silane-containing polyurethane polymer from an organic system onto substrates such as glass, aluminum and the like poses problems of safety, economy and pollution. The safe handling of an organic system is more difficult than an aqueous system, since it might be applied near molten material, where the risk of a fire would be present. Also with an inorganic substrate, maximum coating efficiency may not be achieved in using an organic system. Unhydrolyzed alkoxy silanes applied from organic systems may be less reactive to hydroxy-containing substrates than some other forms of organo silanes present in aqueous systems. Also the cost of using an organic system would be higher, since water is more inexpensive than organic solvents. Also, the use of organic systems poses higher environmental risks than the use of aqueous systems.

Several examples of the application of aqueous dispersions of a polyurethane polymer to a substrate are disclosed in the technological area of chemical treatment of inorganic filaments. In U.S. Pat. No. 4,271,229 (Temple), an aqueous sizing composition for glass fibers is disclosed having a polyurethane polymer and ureido functional silane and amino functional silane, lubricants and processing aids. Also, in U.S. Pat. No. 4,289,672 (Frederich et al.) there is disclosed an aqueous dispersion for treating glass fibers, where the dispersion has a polyurethane-ionomer as a film forming agent and a bonding agent comprising an epoxy-containing alkoxy silane.

The organo silicon compounds employed in these formulations with the polyurethane polymers are used as coupling agents or adhesion promoters. The organo silicon compounds are usually present in treating formulations in their hydrolyzed state to enhance the bonding of the polyurethane polymer to the inorganic oxide surface such as glass and even aluminum and steel. These latter materials are considered to have inorganic oxide surfaces, since their outer surfaces are oxide surfaces even though their inner surfaces are not oxidized. The polyurethane dispersions or latices currently used in mechanical mixtures with the organo silane coupling agents can result in limited stability of the mixture when acidic and/or basic additives are in the mixture. Some of the aqueous dispersions of polyurethane resins lack good electrolytic stability so that the addition of acidic and/or basic chemical compounds destroys the dispersions. In addition, the mechanical actions involved in applying the coating mixtures to the substrate can place further demands on the stability of the polyurethane dispersion. Attempting to gain additional stability in a dispersion of polyurethane resin by adding emulsifying chemicals can be counterproductive because of possible detrimental effects on the final properties of the polyurethane resin in the coating.

With coating mixtures having polyurethane resins, and adhesion promoters or coupling agents like the organo silanes, the final deposition of the organo silane and polyurethane in the coating on the substrate is somewhat random. Each chemical compound acts individually and chemically associates with the substrate or other components in the coating composition in an independent fashion. With the application of both types of compounds, the organo silanes and the polyurethane, in a mixture from one single formulation onto the substrate, the opportunity of the organo silane to become associated with the substrate surface before the occurrence of any association between the polyurethane resin and organo silane, if any, is not assured. The polyurethane polymer may physically block portions of the substrate from reaction or contact with the silane. Also, the organic moiety of the silane may react with other components in the treating formulation before association with the substrate and/or polyurethane. In addition, the organo silanes associate with the hydroxyl-containing substrate through the hydrolyzed groups on the silane compound. Therefore, the organo silane in the coating composition should not have its hydrolyzable groups tied up in any extraneous chemical bonding. Two or more silanes having hydrolyzed groups such as silanols may react to form dimers or higher molecular weight siloxanes. The formation of siloxanes through mutual reaction of the hydrolyzed silicon portion of the silanol groups should be kept at a minimum, because such siloxane formation would be detrimental to the adhesion of the coating to the substrate. Such independent and random association makes the resultant coating on the substrate dependent upon such factors as rates of association of components of the treating formulation and the surface characteristics of the substrate in attracting the hydrolyzed portion of the organo silanes. Therefore, uniformity of the coating on the substrate may be adversely affected by the substrate having islands of concentrations which attract the hydrolyzed portion of the silane and by various rates of association of multiple components in one treating mixture.

A beneficial advance in the polyurethane coating industry would be solutions to the problems of randomness in the formation of coatings on substrates, of limited stability of aqueous dispersions of polyurethane polymers in substrate treating formulations, and of obtaining extended stability of aqueous dispersions only with concomitant reductions in coating performance characteristics.

SUMMARY OF THE INVENTION

The objects of the present invention are to provide a polyurethane reaction product having internal silylation for reduced randomness of resultant coatings, an aqueous dispersion containing the polyurethane reaction product having good stability, a process for producing the aqueous dispersion, and hydroxyl-containing surfaces treated with the aqueous dispersion.

The foregoing objects of the invention are accomplished by the present invention which provides:

(1) an internally silylated polyurethane polymerization reaction product, wherein a substantial number of the silyl groups are siliconate anions—SiO$^-$], —SiO$_2$=] and/or —SiO$_3{}^5$;

(2) an internally silylated polyurethane polymerization reaction product, which can be a prepolymer capable of chain extension having internal silylation and internal dispersibility;

(3) the internally silylated polyurethane polymerization reaction product which is chain extended and has internal silylation and internal dispersibility; and (4) aqueous dispersions of the silylated polyurethane polymerization reaction products and the processes for preparing the aqueous dispersions of the silylated polyurethane reaction products; and (5) inorganic hydroxyl-containing surfaces treated with the aqueous dispersion.

The polyurethane polymerization reaction product as the polymer or prepolymer is formed from organic polyisocyanate, active hydrogen-containing organic compound, and organosilane which has mono and/or di and/or higher functionality in the isocyanate polyaddition reaction. The internally silylated polyurethane polymer has a substantial number of the pendant silyl groups converted to siliconate anions at the desired pH and possibly in the presence of a pH modifier. In addition, the internally silylated polyurethane polymer can have and the prepolymer does have, one or more hydrophilic additives which are ethylene oxide-containing materials and/or ionic or precursor ionic materials.

The ethylene oxide-containing materials include such materials as polyethers with a predominant amount of ethylene oxide moieties, polyoxyethylene homopolymers and monofunctional polyethers and monofunctional polyether polyols and active hydrogen-containing organic compounds having one or two active hydrogens per molecule and having ethylene oxide moieties. The ionic groups or precursor ionic groups can be cationic, anionic or a mixture thereof or materials that can be made to be cationic or anionic or a mixture thereof.

The organosilane has at least one, two or more, or a mixture thereof of functional groups which react with isocyanate, hereinafter referred to as isocyanate-reactable groups, on one or more organic moieties and has at least one hydrolyzed or hydrolyzable group and has the general formula:

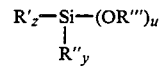

were U is equal to [4−(y+z)] R' and R" are the organic moieties having 1 to 20 carbon atoms such as alkyls having 1 to 6 carbon atoms and aryls, alkyl aryls and aryl alkyls, and y and z are integers so that y is equal to 0 to 1 and z is equal to 1 or 2, where one or both of the R' and R" organic moieties have one isocyanate-reactable group or where R' has one or two isocyanate-reactable groups when y=0 or when the R" organic moiety has no such reactable groups, and where (OR''') is the hydrolyzable or hydrolyzed group such as alkoxy, acyloxy, hydroxy and the like, and R''' can be methyl, ethyl, n-propyl, hydrogen or the like.

To form the prepolymer, the organosilane is used as the comonomer along with the hydrophilic additive, the organic polyisocyanate and organic compound having at least two active hydrogens. The prepolymer can be chain extended with an organic compound having an active hydrogen functionality of two or less in which the active hydrogens are more reactive with isocyanate groups than water to form a polyurethane. In addition, the prepolymer can be devoid of internal silylation and have internal dispersibility from the presence of one or more hydrophilic additives and this prepolymer can be chain extended with an organo silane that has at least two isocyanate-reactable groups on one or more organic moiety.

The aqueous dispersion of the internally silylated polyurethane polymer, prepolymer or chain extended polymer has a sufficient amount of water to produce an aqueous dispersion or an oil-in-water dispersion, where the nonaqueous material is dispersed in the continuous phase. When the concentration of the silyl groups on the polymer, prepolymer or chain extended polymer is greater than around 0.1 weight percent of the water in the dispersion, the pH of the dispersion should be greater than around 7. With larger particle size dispersions, i.e., greater than around 2 or 3 microns, greater concentrations of silyl groups may be tolerated before PH adjustment is required. If the pH of the dispersion is not around this pH from the presence of the constituents of the dispersion, a pH modifier is present in the dispersion. The pH modifier is added in an effective amount to give the aqueous dispersion a pH of greater than around 7 in order to convert a substantial number of the silyl groups to siliconate anions.

The process for producing the aqueous dispersion of the internally silylated polymer, prepolymer or chain extended polymer includes preparing the polymer from the organic polyisocyanate, active hydrogen-containing material having at least two active hydrogens per molecule, and organosilane having one, two and/or more isocyanate-reactable groups on one or more organic moieties and having at least one hydrolyzable or hydrolyzed group associated with the silicon atom. The polymer is prepared at temperature conditions to retard the formation of siloxane groups. In addition, there may be present a hydrophilic additive which is neutralized if any precursor ionic groups are used as the hydrophilic additive. In the absence of or in addition to the hydrophilic additive, an optional external dispersing agent can be added in an amount from greater than 0 to an effective dispersing amount to disperse or to assist in dispersing the polymer in water. The polymer or prepolymer is combined with a sufficient amount of water to form the aqueous or oil-in-water dispersion. If the polymer is a prepolymer, it is chain extended with a chain extender which can be the organosilane having in this case at least two isocyanate-reactable groups. The pH of the aqueous dispersion, if not already at least about 7, is adjusted to at least about 7 when the amount of the silyl groups on the polymer is greater than about 0.1 weight percent of the water in the dispersion. Thereby, a substantial number of the silyl groups are converted to siliconate anions.

Inorganic and organic surfaces or substrates which have reactable hydroxyl functionality can be treated with the aqueous dispersion of the ungelled, internally silylated and dispersible polyurethane polymer. Also the polymer can be cured by having a curing agent added to the dispersion, or by evaporating water and the pH modifier, or by drying in contact with air or any other art recognized method.

DETAILED DESCRIPTON OF THE INVENTION

The polyurethane polymer and aqueous dispersion of the present invention provide an ungelled, polyurethane polymer with pendant, reactable silyl groups, a substantial number of which are siliconate anions. The silyl groups can be unhydrolyzed silanes or silanol groups or mixtures thereof which can be made reactable with various substrates through hydrogen bonding and/or van der Waals bonding and the like. The siliconate anions are reactable with various substrates through covalent bonding, ionic bonding, hydrogen bonding, and/or van der Waals bonding. Since the reactable silyl groups and siliconate anions are pendant from the organic moiety of the organosilane which is part of the polyurethane polymer backbone, the uniformity and proximity of the silicon bonding sites for association of the polymer to the substrate is improved. Although not intending to be bound by any theory in the foregoing, it is believed that the coating composition having the aqueous dispersion of the ungelled, polyurethane with pendant, silyl and/or siliconate anionic groups would have less random association of the polyurethane to the substrate since the location of the silyl and/or siliconate groups are on the polyurethane. Hence, this association between the polyurethane and the substrate may be less dependent on the random interaction of the silane coupling agent with the surface of the substrate due to the presence of silane attracting areas on the surface of the substrate. This may lead to a more efficient interaction between the polyurethane and the substrate through silanol and/or siliconate anion interaction with hydroxyl groups of the substrates resulting in more efficient use of the organosilane coupling agent and polyurethane to achieve good coating performance. The lower or more efficient use is compared to usage, where the polyurethane and organo silanes are used independently in a type of treating formulation that is a mechanical mixture. In addition, the aqueous dispersion of the ungelled, polyurethane resin with the pendant reactable silyl and/or siliconate anion groups has improved stability such as electrolytic stability so that other coating composition additives can be combined with the dispersion without adversely affecting the dispersion.

For the polyurethane polymers in the aqueous dispersion of the present invention, the dispersions are ungelled. The use of the term "dispersions" is intended to include: emulsions, suspensions, colloids, and even forms or states near solutions at higher dilutions of the dispersion. By the term "ungelled" or "non-gelled", it is meant that branching and a small amount of cross-linking may be present in the dispersed resin, but the dispersed resin does not have present the degree of cross-linking necessary to result in a three dimensional polymeric network so as to form a nonsoluble, swellable material.

The terms "pendant" or "lateral", mean that the silyl groups and siliconate anion groups of an organosilane compound predominantly extend from the backbone chain of the polyurethane polymer. When the organo silane is difunctionally isocyanate reactable through one or two organic moieties having functionalities that are reactable in the isocyanate polyaddition reaction, the organic moiety or moieties or a portion of the organic moiety becomes incorporated into the backbone of the polyurethane polymer. In addition, the term "pendant and lateral" are meant to include terminal positioning which may occur to a minor extent. In the polymer, when it is mentioned that the siliconate anions are present in a substantial number or amount it is meant that a majority of the silyl groups laterally present on the polymer have at least one and preferably two of the possible three or less free valences of the silicon atom occupied with oxygen and a cation. At least one of the other valencies of the silicon atom is occupied with the organic moiety which is incorporated into the backbone of the polymer. Any non-siliconate anion valencies are occupied by unreacted alkoxy, acyloxy or the like groups or hydroxy groups such as in silanol groups. The formula below shows the silyl group and the possible positions occupied as the siliconate anion.

(I)

where none or one of groups A, B or C can be an organic moiety, and where one or more of the groups A, B or C are the anionic portion of the siliconate anion, [O$^{31}$] and a cation, and where one or two of the groups A, B and C that are not the siliconate anion are selected from hydroxy, alkoxy, acyloxy or the like. The majority of silyl groups on the polyurethane polymer have at least one of the A, B or C groups as a siliconate anion and preferably the majority, around 50 percent or more of the silyl group, have around two of the A, B and C groups as siliconate anions. Of course, there may be some silyl groups with all of the positions at A, B and C occupied by the siliconate anions.

By the use of the term precursor, it is meant to include as ionic groups those chemical groups which can be converted to ionic groups by chemical reactions such as by acid or basic reactions or neutralization reactions, where the precursor can be utilized in formation of the polymer with subsequent conversion to the ionic state.

The polyurethane resin with the pendant, reactable silyl and/or siliconate anion groups can be formed from isocyanate-containing monomers and/or prepolymers that are reacted with organic compounds having at least two active hydrogens and with organo silane that has mono, and/or di and/or higher functionality, but preferably difunctional, in reaction with isocyanates. The polymer can be prepared directly as a polymeric reaction product or as an isocyanate-containing prepolymer that is chain extended to build the molecular weight of the polymer. Therefore, the reaction between the polyisocyanate and organic compound with at least two active hydrogens can be conducted by processes conventional in the art including the one-shot and prepolymer procedures.

The polyisocyanate which is used to form the polyurethane polymer can be any conventional, art-recognized organic diisocyanate or polyisocyanate. The polyisocyanate may be aromatic, aliphatic, cycloaliphatic, or heterocyclic or mixtures thereof and may be unsubstituted or substituted with groups such as halogens, etc. The aliphatic, and particularly the polyisocyanates are preferred, since it has been found that these provide better color stability in resulting coatings. Also, diisocyanates are preferred although higher polyisocyanates can be used in place of or in combination with the diisocyanates and even with small amounts of monoisocyanate. The average funtionality of the reactants used in making the isocyanate-containing prepolymer is important in controlling the tendency of the polymer to gel. Where higher functionality polyisoycanates are used, some monofunctional isocyanates should be present to reduce the average functionality. Nonexclusive examples of the numerous art-recognized polyisocyanates that can be used in preparing polyurethane resins which may be used in the dispersion of the present invention, include diisocyanates or polyisocyanates which are based on the numerous monomeric organic isocyanates that contain carbodimide groups, allophanate groups, isocyanate groups, urethane groups, acrylated urea groups, biuret groups, ester groups, thioether groups and/or thioester groups and isocyanate-terminated adducts of diols or polyols such as ethylene glycol, 1,4-butylene glycol, polyalkylene glycol and the like, and thioisocyanate which correspond to known poly or diisocyanates that can be employed alone or in mixtures with N-isocyanate containing compounds, substituted organic polyisocyanates, where the substituents are nitro, chloro, alkoxy and other groups which are not reactive with the hydroxyl groups or active hydrogens and provided the substituents are not positioned to render the isocyanate group unreactive. Additional nonexclusive art-recognized polyisocyanates that are used in preparing the silylated polyurethane polymer which may be used in the aqueous dispersion for treating glass fibers of the present invention, include those polyisocyanates enumerated in U.S. Pat. No. 4,413,086 (Chang et al.) and the higher polyisocyanates enumerated in U.S. Pat. Nos. 4,147,679 and 4,066,591 (Scriven et al.). The disclosures of all of these patents are hereby incorporated by reference. A particularly suitable diisocyanate used for preparing the polyurethane polymer is methylenebis-(4-cyclohexylisocyanate) or 4,4'-methylene-bis-(cyclohexyl isocyanate). This particular diisocyanate is commercially available from Mobay Chemical Company under the trade designation "Desmodur W" material.

To react with the polyisocyanate in formation of the polyurethane polymer, conventional, art-recognized organic compound containing active hydrogens may be used. The term "active hydrogens" refers to hydrogens which, because of their position in the molecule, display activity according to the Zerewitinoff test. Accordingly, active hydrogens include hydrogen atoms attached to oxygen, nitrogen or sulfur and thus useful compounds will include those having at least two of these groups in combination such as hydroxyl (—OH), amines (—NH or —NH$_2$) and thio (—SH). The moieties attached to each group can be aliphatic, aromatic, cycloaliphatic or of a mixed type not including carbonyl, phosphonyl or sulfonyl linkages. Nonexclusive examples of such compounds include amines like polyamines, aminoalcohols, mercapto-terminated derivatives and alcohols which include polyhydroxy materials (glycols and polyols). The polyhydroxy compounds include those of the following classes of compounds: lactone polyols and the alkylene oxide adducts thereof; the polyester polyols and the alkylene oxide adducts thereof; the polyalkylene polyols and polyoxy cycloalkylene polyols and the alkylene oxide adducts thereof; the nonreducing sugars and sugar derivatives and the alkylene oxide adducts thereof; the alkylene oxide adducts of polyphenols; and the polytetramethylene glycols; and the functional glycerides, such as castor oils; and polyhydroxy polysulfide polymers and the hydroxyl terminated extended lactone polyesters such as those prepared by phosgenating a lactone polyester with a polyol such as bisphenol A and the like. The term "alkylene oxide" used above includes for example, ethylene oxide, 1,2-epoxy propane, 1,2-epoxy butane, 2,3-epoxy butane, isobutylene oxide, epichlorohydrin and the like and mixtures thereof. Further examples of the organic compounds with at least two active hydrogens useful in the present invention are given in U.S. Pat. Nos. 4,147,679 and 4,066,591, already incorporated herein by reference.

A particularly useful group of organic compounds containing active hydrogens useful in the present invention are the polyester polyols, which are esterification products ranging from liquids to non-crosslinked solids, that is, solids which are insoluble in many of the more common inert, normally liquid, organic solvents. The polyester polyols are prepared by the polyesterification of organic polycarboxylic acids or anhydrides thereof or lactones or mixtures thereof with organic polyols. Usually the polycarboxylic acids, polyols and polycarbonate polyols, such as Duracarb TM polyols available from PPG Industries, Inc., are aliphatic or aromatic dibasic acids and diols. Further, nonexclusive examples of the polyester diols, which are useful in the present invention, like polycaprolactone-type polyesters formed from the reaction of a cyclic lactone such as epsilon-caprolactone with a polyol or hydroxy acid are disclosed in U.S. Pat. Nos. 3,169,949 (Hostettler), 4,147,679, 4,066,591, and 3,832,333, the disclosures of which are hereby incorporated by reference. Also other examples include the product of cyclic lactone with an acid-containing polyol, reaction products of urea and caprolactones products obtainable by substituting a polyesteramide polyol, or a mixture of polyester amide polyols for part or all of the polyester polyol and higher molecular weight polyether and polyester polyols, hydroxy-containing acrylic interpolymer products which are described in U.S. Pat. No. 3,919,351 (Chang et al), hereby incorporated by reference. A particularly suitable polyester polyol useful in the present invention is the polycaprolactone diol available under the trade designation "Tone-200" from Union Carbide Corporation, which is a reaction product of diethylene glycol and Epsilon-caprolactone.

The amounts of the polyisocyanate and organic compound with at least two active hydrogens employed in preparing the polyurethane polymer are those amounts conventionally used in a one shot or prepolymer preparation process. Therefore, these compounds can have a stoichiometric ratio or the polyisocyanate can be used in an excess amount usually ranging up to about 3 to 1.

In preparing the internally silylated polyurethane, silylation is introduced through an organosilane, which is at least mono-functionally reactive with isocyanates, and which is used as a comonomer or as a chain extender during the formation of the polymer. The organosilane would have the formula:

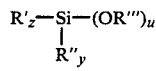

where U is equal to $[4-(y+z)]$ and where R' and R" are the organic moieties having 1 to 20 carbon atoms such as alkyls having 1 to 6 carbon atoms and aryls, alkyl aryls and aryl alkyls, where y and z are integers so that y is equal to 0 or 1 and z is equal to 1 or 2, where one or both of the R' and R" has at least one and/or two and/or more isocyanate-reactable groups when $y=0$ or when the R' organic moiety has no such reactable groups, and where (OR''') is the hydrolyzable or hydrolyzed group such as alkoxy, acyloxy, hydroxy and the like and R''' can be methyl, ethyl, n-propyl, hydrogen or the like. The $R'_2$ group preferably is selected from organic moieties having 3 to 10 saturated carbon atoms such as alkyls, divalent alkyls, a divalent polyoxyalkylene or polyoxyalkylene having not more than 1 ether oxygen per 2 carbon atoms and divalent alkyls, and organic moieties that are at least monovalent and/or divalent and/or polyvalent and mixtures thereof in having at least one and/or two and/or more functional groups selected from hydroxyl (OH), mercapto (SH), ureido (NH—C(O)—NH), primary or secondary amines ($NH_2$, NHR), and tertiary amines ($N[C_2H_4OH]_2$). These functionalities are nonexclusive examples of isocyanate-reactable groups. As with the other reactants for the polymer, when functionalities of more than two exist for the isocyanate reactive group, some monofunctional isocyanate reactive groups should be present to deter gelation. It is preferred that the $R'_z$ moiety has $Z=1$. and R' is a saturated moiety with two isocyanate-reactable groups, and it is preferred that in $R''_y Y=0$. In the aforedescribed formula for the organosilane, the silyl group is represented by the moiety $R'_z - Si^{3+,3-}]$ showing that the silyl group can have three other bonds. Nonexclusive examples of monofunctional isocyanate-reactable organosilanes include: aminoethyltriethoxysilane, gamma-aminopropyltriethoxysilane, gamma-aminopropyltrimethoxysilane, gamma-aminopropylethyldiethoxysilane, gamma-aminopropylphenyldiethoxysilane, gamma-aminopropyltrimethoxysilane, deltaaminobutyltriethoxysilane, deltaaminobutylethyldiethoxysilane. Preferred amino silanes are the gamma-aminopropyltrialkoxysilanes. Nonexclusive examples of the difunctional, isocyanate-reactable alkoxy silanes include: N-beta(amino ethyl)-gamma-aminopropyltrimethoxy silane, N-beta(amino propyl)-gamma-aminopropyltrimethoxy silane, N-(dimethoxy methyl silyl isobutyl)ethylene diamine. A particularly suitable organo silane which is difunctional in the isocyanate polyaddition reaction is the N-beta-(amino ethyl) gamma aminopropyltrimethoxy silane which is available under the trade designation A-1120 from Union Carbide Corporation and under the trade designation Z-6020 from Dow Corning Chemical Corporation. In addition to the monofunctional and/or difunctional isocyanate reactive organosilane, a trifunctional isocyanate reactive organosilane can be used. A nonexclusive example of such an organosilane is N-beta(ethylenediamino)ethylgamma aminopropyltriethoxy silane available from Union Carbide Corporation as A-1130 triamino silane. In using the mono, di- or trifunctional organosilanes as a mixture of one or more of them, it is preferred that the amounts of the mono and trifunctional silanes not exceed the amount of the difunctional isocyanate reactable organo silane. In this way, the difunctional form is always the predominant form whenever the isocyanate-reactive functionality of the organosilane is greater than two, its use should be limited in such a manner to discourage the formation of a highly branched and/or crosslinked polyurethane polymer so that a three-dimensional polymeric network is formed. It is preferred when using the organosilane to limit the presence of any dimer or trimer forms of silanol or siloxane. It is most preferred to have 100 percent monomeric, difunctional, isocyanate-reactable organosilane including any suitable solvent such as the A-1122 silane available from Union Carbide Corporation. The amount of the organosilane which can be used is in the range of about 0.05 to greater than 0.6 weight percent of the total urethane formulation. An advantage of the present invention is to allow for the presence of higher concentrations of silyl groups associated with the polyurethane polymer, therefore, it is preferred to use amounts of organosilane in excess of 0.6 weight percent. The only upper limit on the amount of organosilane used is that amount which would cause three dimensional gelation through interactions of the non-siliconate anion groups such as silanols to form siloxanes.

In addition to the polyisocyanate, organic compound with at least two active hydrogen atoms, and organosilane that has reactable functionalities in the isocyanate polyaddition reaction, the silylated polyurethane polymer, prepolymer or chain-extended prepolymer can be formed with one or more hydrophilic additives. Hydrophilic additives such as non-ionic solubilizing groups and/or ionic and/or ionic precursor groups can be incorporated into the polymer. The hydrophilic agents can be incorporated into the polymer structure either in the backbone of the polymer or pendant from the polymer backbone to remain in the polymer even after the coating has been applied to introduce the hydrophilicity into the coating. The degree of hydrophilicity introduced into the coating should not be too great, since larger degrees of hydrophilicity will adversely affect the film forming properties of the polyurethane resin. The hydrophilic additives generally can be selected from art-recognized non-ionic, ionic and ionic precursor type solubilzing groups. The types of hydrophilic additives disclosed in U.S. Pat. Nos. 4,066,591 and 4,147,679 already incorporated herein by reference, are examples of hydrophilic additives that can be used. Nonexclusive examples of the nonionic type hydrophilic additives include: poly(ethylene oxide) homopolymer, ethylene oxide moieties incorporated into the polymer from the isocyanate or through the active hydrogen compound of the prepolymer, and monofunctional polyethers, polyether polyols and polyethers containing a substantial amount of ethylene oxide units, and organic compounds which are difunctional in the isocyanate polyaddition reaction and contain lateral, hydrophilic ethylene oxide units, monoisocyanates which contain terminal, hydrophilic ethylene oxide units, and organic compounds which are monofunctional in the isocyanate polyaddition reaction and contain terminal, hydrophilic ethylene oxide units and mixtures of these hydrophilic additives. Whenever the hydrophilic additive is to be incorporated into the backbone of the polyurethane resin, as is preferred, the hydrophilic additive is poly(oxyethylene) homopolymer, which is added as a comonomer in the formation of the polyurethane polymer or prepolymer. When the hydrophilic additive is lateral and/or terminal in the polyurethane resin, then the hydrophilic additive can be the monomeric, alkylene epoxide materials having an ethylene oxide content of about 15 to 100 mole percent of the monomeric alkylene oxide. Other alkylene oxides which can be present when the amount of ethylene oxide is less than 100 mole percent include polymers or copolymers of styrene oxide, propylene oxide, tetrahydrofuran, butylene oxide, or epihalohydrin.

These nonionic hydrophilic materials may be prepared by any method known to those skilled in the art. It is even possible to incorporate the nonionic, hydrophilic additive into another monomer for the isocyanate polyaddition reaction. For instance, the isocyanate having hydrophilic agents such as the ethylene oxide moieties which would be used in a mixture with polyisocyanate not having ethylene oxide units can be prepared to have from about 5 to about 100 mole percent of a diisocyanate of polyethylene oxide units. Such a modified allophanate diisocyanate can be prepared by heating one mole of a monofunctional ethylene oxide containing alcohol with two moles of the diisocyanate having a general formula of $R(NCO)_2$. The first stage of the reaction yields the urethane which then reacts with a second mole of diisocyanate at a higher temperature to give rise to the allophanate diisocyanate. Other nonionic, hydrophilic additives like monomer alcohols containing polyethylene oxide units such as those represented by the formula $HO(CH_2CH_2O)_xCH_2CH_2-Y-R$ can be prepared by alkoxylation of secondary amines where $Y=0$ or $N$ for nitrogen, and where the R is a hydrocarbon group, in particular, $C_1$ to $C_{10}$ alkyl groups, $C_4$ to $C_8$ groups, $C_6$ to $C_{12}$ aryl groups or $C_7$ to $C_{10}$ aralkyl groups, and where any suitable alcohol or phenol may be used such as for example, methanol, ethanol, n-propanol, n-hexanol, p-cresol, benzyl alcohol or the like, and where any suitable secondary amine may be used such as, for example, dimethyl amine, diethyl amine, dipropylamine and the like. The quantity of ethylene oxide grafted into the monomeric ethylene oxide-containing alcohol or phenol generally has about 5 to about 90 mole percent of the ethylene oxide moiety. This hydrophilic agent can then be used as a comonomer in the reaction with polyisocyanate and a difunctional organic compound having active hydrogens. This hydrophilic agent is usually used in an amount of not more than 50 percent of the weight of the polymer and preferably in an amount of less than about 10 percent by weight based on the weight of the polymer.

Another hydrophilic additive that can be used alone or in combination with the ethylene oxide-containing hydrophilic additive is an ionic or ionic precursor material, where the ionic groups are cationic, anionic, or both. The ionic precursor materials through neutralization or other like chemical reactions can be converted to ionic groups such as anionic, cationic, amphoteric and zwitterionic. The ionic groups can be salt groups such as acid salt groups which can be selected from the group consisting of: ($-OSO_3-$), ($OPO_3-$), ($COO^{31}$), $SO_2$), ($POO^{31}$) and ($PO_3^-$). Although the acid salt groups which are anionic are preferred, the cationic salt groups can be used where such groups can be selected from the class consisting of $-N-+$, $-P-+$ and $-S-+$ and mixtures thereof. When the ionic group is used in forming the polymer, the polymer can be prepared with reactants containing the acid salt group or the precursor ionic groups such as free acid groups. The free acid groups are subsequently neutralized after polymer formation. Suitable materials for introducing acid groups and anionic, cationic and precursor ionic groups into the polymer are those given in U.S. Pat. Nos. 4,147,679 and 4,066,591 which have been incorporated by reference. A particularly useful precursor ionic material is dimethylolpropionic acid. As mentioned in U.S. Pat. Nos. 4,147,679 and 4,066,591, the suitable salt forming agents for converting the precursor ionic compounds to ionic compounds include inorganic and organic bases such as sodium hydroxide, potassium hydroxide, ammonia and tertiary amines. It is preferred to have the hydrophilic additive present to make the polymer internally dispersible. This type of polymer can be used to prepare an essentially emulsifier free polyurethane aqueous dispersion.

By the term "essentially emulsifier free" it is meant that the polyurethane dispersion usually needs no externally added emulsifiers or detergent to maintain its stability, although emulsifiers which are externally added may be used if desired. The polyurethane resin dispersions of the present invention are very stable in that once the resins are dispersed, they will not settle or flocculate.

It is preferred in preparing a polyurethane polymer with internal silylation, where the polymer should have good film forming properties that the hydrophilic additive is one having ionic groups or precursor ionic groups. In using mixtures of the ethylene oxide-containing material and ionic or precursor ionic materials, the materials may be added to form the polymer or prepolymer in a sequential or simultaneous manner with each other and other components to form the polymer or prepolymer. The only exception is where the ionic or Precursor ionic material would interfere with the reaction of the organosilane and polyisocyanate. In this situation, the ionic or precursor ionic material should be added subsequent to near complete reaction of the organosilane and polyisocyanate. When the hydrophilic additive utilizes an ethylene oxide-containing moiety, it is preferred to use a poly(oxyethylene) homopolymer. It is most preferred that the molecular weight of the polyoxyethylene homopolymer is in the range of greater than 1,000 up to about 4,000 in order to obtain a polyurethane resin which is a good film former having good tensile strength. In addition, the polyoxyethylene homopolymer provides good electrolytic stability of the resulting aqueous dispersion of the silylated polyurethane resin for the addition of acidic or basic components to the dispersion.

In the polymer or prepolymer, the amount of the hydrophilic additive which is an ethylene oxide-containing material should not exceed about 10 weight percent of the polymer or prepolymer. Amounts of such hydrophilic additives in excess of 10 weight percent could be used and would improve the dispersion of the polyurethane resin, but the resulting polyurethane resin used on substrates as a coating would have a reduced tensile strength and an increased elongation. When the hydrophilic additive is an ionic or precursor ionic material, the amount generally should not exceed about 50 weight percent. The ionic or precursor ionic material can replace all of the organic compound with at least 2 active hydrogens in formation of the polymer. The amount of the hydrophilic additive used in obtaining the polymer should be at least about 3 weight percent of the isocyanate reactive monomers when the di or polyisocyanate material that is used has a hydrophilicity equivalent to methylene-bis(4-cyclohexyl isocyanate). When the di or polyisocyanate is a more hydrophilic material than the methylene-bis-(4-cyclohexyl isocyanate) a lesser amount of hydrophilic additive can be used, and conversely, when the di or polyisocyanate is more hydrophobic than the methylenebis-(4-cyclohexyl isocyanate) larger amounts of hydrophilic additive can be used. In using a mixture of the hydrophilic additives, such as the ethylene oxide-containing material and the ionic or precursor ionic materials, it is preferred to have a majority of the hydrophilic additive as the ionic or precursor ionic material and a minority of the hydrophilic additive as the ethylene oxide-containing material to improve the final properties of the silylated polyurethane resin. As is known in the art, the emulsifying power of the ethylene oxide-containing material and the ionic material are not equivalent, and it would take less ionic material to disperse a polyurethane resin than the amount of the ethylene oxide-containing material for an equivalent polyurethane resin. Therefore, if the ethylene oxide-containing material is used alone as the hydrophilic additive, a slightly larger amount of this material than the 3 weight percent may be needed for a polyurethane having an equivalent hydrophilicity to the polyurethane obtained from methylene-bis-(4 cyclohexyl isocyanate).

The polyurethane polymer or prepolymer or chain extended polymer having internal silylation with or without internal emulsification can be prepared by the techniques of one-shot or prepolymer procedures known to those skilled in the art, where the organo silane which has reactable functionalities in the isocyanate-polyaddition reaction is used as a comonomer and/or as a chain extender. For example, the reaction to form the single shot polymer or prepolymer is essentially anhydrous to retard any reaction of the isocyanate groups with water. Also, the reaction may be conducted in the melt phase or in the presence of a solvent. The solvent is employed to facilitate reaction and control the viscosity. The viscosity of such a polymer or of the prepolymer is important in obtaining a stable aqueous dispersion with a finely particulated disperse phase.

The viscosity of the polymer or prepolymer can be reduced by heating the neat polymer melt or by dissolving the polymer in a suitable solvent. Dissolution of the polymer or isocyanate-containing prepolymer in an organic solvent is preferred, because it is an easier way to control polymer viscosity. Suitable solvents are those which are unreactive toward the isocyanate groups. Such solvents are organic solvents such as ketone, tertiary alcohols, ethers, esters, amides, hydrocarbons, chlorohydrocarbons, and chlorocarbons. Suitable solvents for the polymer product to be dispersed in water, which are unreactive toward isocyante groups, can be added right before the polymer or prepolymer is dispersed in the water, during dispersion or after dispersion. Solvents for the final polymer product should be water-soluble, if they are added after dispersion and examples include ketones and alcohol.

The polymer and prepolymer reaction can be conducted in the presence of a catalyst known to accelerate the reaction between isocyanate groups and organic compounds containing active hydrogens. Nonexclusive examples of such catalyst include organo tin compounds, like dibutyl tin dilaurate, stannous octoate, and tertiary amines. Generally, the use of a catalyst is not necessary and for specific uses it may be preferred to conduct the reaction without a catalyst. The reaction can take from several minutes to several days depending on the reactivity of the reactants, temperature, presence or absence of catalysts and the like.

The polyurethane polymer or isocyanate-containing prepolymer is prepared from the polyisocyanate, the organic compound with active hydrogens, the isocyanate-reactive organosilane, which is preferably difunctional in the isocyanate-polyaddition reaction, with or without the presence of hydrophilic additive, where these materials are all comonomers. When the hydrophilic additive is used and it is an ethylene oxide-containing compound for lateral attachment to the polymer backbone or the hydrophilic additive is an anionic compound, the order of addition of the reactants will be different. The polyisocyanate is reacted with the organic compound having active hydrogens and, if used, the hydrophilic additive like the poly(oxyethylene) glycol, and organosilane by charging all of the monomers to a suitable reaction vessel simultaneously or sequentially. For example, the polyisocyanate is usually first charged to any suitable reaction vessel known in the art followed by the addition of the organosilane. Subsequently or simultaneously, the active hydrogen-containing compound is added. Subsequently or simultaneously, if the polyoxyethylene glycol homopolymer is used, it is added. The mixture may then be heated, if necessary, with agitation until the isocyanate has completely reacted with the organosilanes and the active hydrogens and, if used, the hydrophilic additive to produce the polyurethane polymer or NCO-containing prepolymer. The polymer or prepolymer would have an essentially constant NCO equivalent, when the reaction is stopped.

The polyurethane polymer or isocyanate-containing prepolymer is preferably linear to the highest degree possible which is accomplished by preferably using at least an equivalent ratio of isocyanate groups to isocyanate-reactive groups. These latter materials include the organic compound with active hydrogen groups, the organosilane and any hydrophilic additive to obtain the polyurethane polymer. To obtain the isocyanate-containing prepolymer an excess of di or polyisocyanate may be used. Generally, the ratio of isocyanate groups to isocyanate-reactive groups is maintained in an excess amount of between about greater than 1:1 to about 3:1. With the simultaneous addition of the reactants, the polymer or prepolymer will be a random copolymer. When the reactants are added in a sequential addition, the reaction will lead to the production of block copolymers. It is preferred to produce the random copolymer. The polyurethane one shot polymer or chain extended prepolymer is at least a copolymer having at least two types of repeating units from the monomers, polyisocyanate, and organic compound with at least 2 hydrogens, and hydrophilic additive, if used, and from the organosilanes comonomer or chain extender.

The reaction temperature during one shot polymer or prepolymer formation must be at a tamperature less than around 200° C. at atmospheric pressure or any equivalent temperature at a different pressure to minimize the occurrence of certain side reactions. These reactions include transesterification or transalkoxylation reactions between the organosilanes and the organic compounds with active hydrogens such as polyols or the poly(oxyethylene) glycol homopolymer, and reactions that result in appreciable amounts of allophanates and biurets. The reaction is continued until an essentially constant NCO equivalent is obtained, but the one-shot polyurethane polymer or isocyanate-containing prepolymer can have a free isocyanate content of about 1 to about 8 percent based on the weight of the polymer or prepolymer. Generally, the molecular weight of the one-shot polymer is around 25,000 while that of the prepolymer is less than about 25,000 and preferably is in the range of about 500 to 5,000. The molecular weights can be in either number average or weight average measurements or any other molecular weight measurement known for polymeric materials. Preferably, the reaction temperature is in the range of about −20 to 130° C. and most preferably from about 60 to about 90° C. In preparing the isocyanate-containing prepolymer reaction as opposed to the one shot polymer reaction, the anhydrous environment of the reaction can be modified by first reacting the organo silane material with the isocyanate to end-cap the isocyante groups. Then the end-capped isocyanate groups can be reacted with the organic compound having active hydrogens and the hydrophilic additive that contains ethylene oxide moieties in an environment that is somewhat less than anhydrous, although not too much water should be present.

The order of addition of the reactants to form the polymer is important when the reactants are polyisocyanate, organic compounds with active hydrogens, and organosilane used as a comonomer and a hydrophilic additive which has or is an ionic group. An ionic or precursor ionic hydrophilic additive is capable of reacting with some of the reactants or a mono functional ethylene oxide-containing organic compound or a mixture of these materials with any other hydrophilic additive in a manner to interfere with other polymeric reactants of these materials. When the hydrophilic additive includes or is an ionic hydrophilic additive, such as the anionic hydrophilic additive with carboxylic groups, the difunctional organo silane should be nearly completely reacted with the polyisocyanate before the addition of the ionic hydrophilic additive to the polymeric or isocyanate-containing prepolymer reaction. Another approach to avoid such interfering reactions is to neutralize any precursor ionic hydrophilic additive before dispersing the one-shot polymer or isocyanate-containing prepolymer in water. Alternatively, the order of addition to avoid interfering reactions could be to neutralize any ionic or precursor ionic hydrophilic additive and add the organosilane and subsequently, add the polyisocyanate. In this approach, the organic compound with at least 2 active hydrogens could be added at any time. Also when monofunctional hydrophilic agents are added to the polymeric or isocyanate-prepolymeric reactions, these materials should be added after the reaction of the comonomers of the polyisocyanate, organic compound with active hydrogens, and organosilanes have progressed for some period of time.

The average functionality of the reactants used in preparing the one-shot polymeric and isocyanate-containing prepolymer is important in controlling the tendency of the polymer to gel. Where active hydrogen-containing materials and polyisocyanates with higher functionalities such as trifunctional and higher functional materials are used, the use of some monofunctional active hydrogen-containing compounds and isocyanates is preferred. It is most preferred to use the reactants which are exclusively difunctional in order to obtain a high degree of linearity of at least 50 percent in the silylated polyurethane polymers. As is known to those skilled in the art of chemistry of high polymer polyurethane latices, the addition of small quantities of trifunctional, low-molecular weight material can improve the properties of the resulting polymer. For these purposes, the amount of such trifunctional material that could be added should be limited to less than around one equivalent percent based on the weight of the one-shot polymer or isocyanate prepolymer. In the prepolymer procedure after the completion of the first stage of the two stage process, the one-shot polyurethane polymer would also be ready for dispersion in water after reaction of the comonomers to the desired NCO equivalent. For other general conditions of forming a polyurethane polymer by the two stage prepolymer process, the disclosures of U.S. Pat. Nos. 4,147,679 and 4,066,591 are hereby incorporated by reference.

Additional optional materials that may be used in forming the one-shot polymer or isocyanate-containing prepolymer are low molecular weight, active hydrogen-containing compounds such as polyols. It is especially preferred to add these polyols as comonomers in forming the one-shot polyurethane polymer or isocyanate-containing prepolymer. It is most preferred to use these polyols as comonomers in forming the prepolymer, when the resultant polyurethane resin is to be used as a film former for coating various substrates. In general, the low molecular weight, active hydrogen-containing compound will be present in an amount up to about 50% by weight of the prepolymer, preferably about 2 to about 35 percent by weight based on total weight of the one-shot polymer or prepolymer reactants. When the low molecular weight, active hydrogen-containing compound is needed for water solubility, such as is the case with polymers and prepolymers containing non-ionic water solubilizing groups, higher percentages of the low molecular weight, active hydrogen-containing compounds should be employed. For example, amounts ranging from about 2 to about 35 percent by weight based on the total weight of the one-shot polymer or prepolymer reactants can be used. A particularly suitable hardening active hydrogen-containing polyol useful in the present invention for incorporating hard segments is butane diol, and especially 1,4-butane diol. Any active hydrogen-containing compound with a low molecular weight which will function to harden the polyurethane film forming polymer on the surface of the inorganic and organic substrates can be used.

With the formation of the one-shot polyurethane polymer and isocyanate-containing prepolymer in a nonaqueous or anhydrous environment, any precursor ionic groups present on the polymer or prepolymer should be converted to ionic groups to make the polymer or prepolymer more hydrophilic for dispersion in water. The precursors are converted into ionic groups by neutralizing the precursor to the ionic group in a nonaqueous neutralization step. The neutralization reaction can be conducted at various times during the formation of the polymer or prepolymer. For example, the neutralization can occur after the polymer or prepolymer is formed from the organic compound with the active hydrogens, the organo silane, the polyisocyanates, and the hydrophilic additive which is the ionic containing group or a precursor thereof or a mixture of these materials with the ethylene oxide-containing type hydrophilic agent. Of course, where the polymer or prepolymer is formed without the use of hydrophilic additives or with just the use of the ethylene oxide-containing type hydrophilic additives, neutralization of the polymer or prepolymer before dispersion is not necessary. Also neutralization can occur by an alternative route which is after the formation of the polymer or prepolymer from the organic compound having the active hydrogens and the ionic or precursor ionic hydrophilic additive and the di, poly and mono isocyanates. After the neutralization, the monofunctional and/or difunctional and trifunctional organosilane would be added. Then this prepolymer would be ready for dispersion in water. Also the neutralization can occur after the organic compounds having active hydrogens are contacted with the ionic or precursor ionic hydrophilic additive before the addition of any of the isocyanate-containing material and the difunctional organo silane. Also the neutralization can occur after the prepolymer is added to water. Also neutralization could occur directly to the group containing the ionic precursor group before this material is reacted in any way with other reactants to form the polymer or prepolymer. The degree of neutralization should be sufficient to convert a substantial amount of the ionic precursor, hydrophilic additives to the actual ionic hydrophilic additives to assist in the dispersion of the polymer or prepolymer. Generally, the amount of neutralization needed to assist in the dispersibility of the polymer or prepolymer depends on such nonexclusive factors as the hydrophilicity or hydrophobicity of the polymer or prepolymer. This would include the amount of hydrophilic ethylene oxide-containing additive used in preparing the polymer or prepolymer.

Generally, the neutralization reaction can be carried out in any manner known to those skilled in the art in preparing polyurethanes according to the two stage prepolymer process. Examples include heating at temperatures of from about 20° C. to 150° C. Suitable neutralizing agents should be those that provide monovalent counter ions as discussed in U.S. Pat. Nos. 4,147,679 and 4,066,591 which have been incorporated herein. Of course the neutralizing agents that have the monovalent counter ion can be used in a mixture with other types of neutralizing agents as long as the amount of other neutralizing agents does not cause a large degree of cross-linking of the prepolymer.

The percentage of ionic groups in the prepolymer can be expressed as the salt group equivalent weight. This is defined as the weight per salt group, and it can be determined by dividing the weight of the prepolymer in grams by the number of salt groups present in the prepolymer. The salt group equivalent weight of the prepolymer should broadly be 6,000 or less, preferably from about 200 to 500, in order to form stable dispersions. The importance of the salt group equivalent weight and counter ion concentration in avoiding gelation is described in U.S. Pat. Nos. 4,066,591 and 4,147,679 already incorporated by reference.

The neutralized one-shot polyurethane polymer or isocyanate-containing prepolymer usually has a viscosity range of about 50 to about 10,000 and preferably usually has a viscosity range of about 50 to about 10,000 and preferably from about 100 to 5,000 centipoise at ambient temperatures. Polymers having viscosities within this viscosity range are ready to disperse in water with only mild agitation. Polymers with higher viscosities than 10,000 centipoise are difficult to disperse with mild agitation and may require mixing of the polymer or prepolymer with water in an apparatus which is able to generate high shear gradients along with the use of small quantities of solvent or external dispersants or emulsifiers. The solvent would assist in dispersing the polymer or prepolymer by plasticizing the polymer or prepolymer during processing. Additional nonmechanical dispersion aides may also be useful such as sound waves of extremely high frequency. The types of apparatus used for dispersing the one-shot polyurethane polymer or isocyanate-prepolymer are stirrer-equipped vessels or the flow mixers and other similar apparatus known to those skilled in the art of preparing polyurethane latices. The one-shot polymer and isocyanate-containing prepolymer are actually mixtures of oligomers with various lengths and random orientation of the various monomers along the oligomeric chains.

In describing the prepolymer as an isocyanate-containing prepolymer and in describing the one-shot polyurethane polymer as used in the specification and claims, it is intended to cover not only polycondensates of polyisocyanates and polyols, but also condensates of polyisocyanate with any active hydrogen-containing material eluded to before in the specification. Thus, the terms "isocyanate-containing prepolymer" are defined as any polymer containing two or more isocyanate groups, where the prepolymer has an excess amount of isocyanate groups, and are also intended to cover polyurea type polymers and prepolymers or mixtures of polyurethane and polyurea type polymers and prepolymers and polythiourethane type polymers and prepolymers.

When one or more hydrophilic additives are not incorporated into the polyurethane polymer or prepolymer or chain extended prepolymer having internal silylation, the polymer or prepolymer is dispersed in water with the aid of external emulsifiers. Even when the hydrophilic additives are incorporated into the polymer, external emulsifiers optionally can be used. The external emulsifiers that can be used are one or more art-recognized dispersants or emulsifiers which alone or in combination give an effective matching of the hydrophilic-lipophilic balance (HLB) for dispersibility to the HLB or HLB character of the polyurethane polymer or prepolymer. Such a procedure is known in the art as shown in the article entitled "Calculations of HLB Values of Non Ionic Surfactants", William C. Green, The American Perfumer & Essential Oil Review, May, 1955, which is incorporated herein by reference. Generally, any nonionic, cationic, anionic, amphoteric or zwitterionic dispersant or emulsifier can be used which has the effective HLB value in an effective amount to disperse the polyurethane polymer or isocyanate-containing prepolymer. To form an oil-in-water dispersion of the polyurethane polymer or prepolymer with external emulsifiers, strong shear forces may be necessary if these materials have higher viscosities. Small amounts of water-soluble organic solvents may be used with the external emulsifiers to ease the dispersion of the polyurethane polymer or prepolymer. The one or more external dispersants can be added prior, simultaneously, or sequentially with the polymer or prepolymer addition to water. In adding these materials to water, the dispersion is prepared in the same manner as for the polymers and prepolymers having hydrophilic additives as is more fully discussed infra.

The one-shot polyurethane polymer or isocyanate-containing prepolymer having hydrophilic additives can be dispersed in water in a number of ways. The polymer or prepolymer, whether neat or a solution, preferably is added incrementally to most or a substantial portion of the aqueous dispersing medium with agitation. Alternatively, the aqueous dispersing medium can be added incrementally to the polymer or prepolymer with stirring. However, this latter method is less preferred because commonly upon initial addition of the dispersing medium, a high viscosity, grease-like material results. The main disadvantage associated with the grease-like viscosity is that it is very hard to stir in more water. In the absence of efficient stirring, the possibility increases of forming an unstable emulsion system because of large particle size agglomerates. By adding the polymer or prepolymer to water, this high initial viscosity is avoided. As noted in U.S. Pat. Nos. 4,147,679 and 4,066,591, additional solvent can be added to the isocyanate-containing prepolymer or even to the one-shot polymer before or after addition of the polymer or prepolymer, where the solvent is added to the aqueous medium. In referring to the aqueous dispersing medium, it is intended to include water plus water having solvent and possibly neutralizing agents. If the water is added to the polymer or prepolymer, any method known to those skilled in the art in producing polyurethane aqueous dispersions can be used to reduce the possibility of increasing the formation of large particle size agglomerates.

Chain extension of the isocyanate-containing prepolymer that is dispersed in the aqueous dispersing medium can be conducted to increase the molecular weight of the isocyanate-containing prepolymer. The chain extender can be added to the aqueous dispersion or can be present in the aqueous dispersing medium when the isocyanate-containing prepolymer is dispersed. When the chain extender is added to the aqueous emulsion of the isocyanate-containing prepolymers, it is added fairly quickly. Any of the chain extenders and methods for chain extending isocyanate-containing prepolymers known to those skilled in the art of forming aqueous polyurethane dispersions by the two step prepolymer process, can be used. Examples of the chain extenders and the method for chain extension are given in U.S. Pat. Nos. 4,147,679 and 4,066,591, both of which have been incorporated by reference. A suitable chain-extender for use in the present invention is diethylene triamine.

To accomplish chain extension of the prepolymer in the aqueous dispersing mediums to minimize the occurrence of any cross-linking through the chain extender, an accurate amount of the chain extender is used. This amount can be determined by any method known to those skilled in the art. An example of such a method includes addition of a known amount of dibutyl amine or similar reactant with a back titration with hydrochloric acid. Generally, the chain-extender can have an average functionality capable of reacting with isocyanate of between about 2 and 6. But it is preferred that the functionality is around 2 to assure an ungelled polyurethane polymer. Functionalities slightly greater than 2, for example 2.5, can be achieved by using a mixture of chain-extenders with various functionalities. For example, a functionality of 3 can be achieved by using a mixture of trifunctional chain extender and mixtures of difunctional and tetrafunctional chain-extenders or mixture of trifunctional, difunctional and tetrafunctional chain-extenders or any suitable mixtures thereof. The amount of the chain-extender to be used is dependent upon the number of terminal isocyanate groups in the isocyanate-containing prepolymer. Generally the ratio of terminal isocyanate groups of the prepolymer to the active hydrogens for reaction with isocyanates on the chain-extender is between about 1 to 6 and 1 to 1.1. Lesser amounts of the chain-extender will allow for too high a degree of reaction between the isocyanates and the water. Large excesses of the chain-extender may also lead to products with low molecular weight. The reaction of the chain extender with the isocyanate-containing prepolymer is usually conducted at temperatures from about 5 to 90° C. and less than 200° C. when the chain extender is the difunctional isocyanate reactive organo silane. The reaction conditions are maintained in the presence of a pH modifier until the isocyanate groups are essentially completely reacted. It is preferred to add the chain extender in increments to the dispersed prepolymer with agitation and immediately thereafter add the pH modifier. Chain-extenders which introduce additional hydrophilic characters to the polyurethane polymer can also be used. For example, if the hydrophilic agent used as the comonomer in producing the polyurethane resin is solely the ethylene oxide-containing compound, additional ionic compounds can be added for additional hydrophilicity of the polymer by using chain-extenders having ionic groups which have been neutralized. Also if the hydrophilic agent used as the comonomer in forming the prepolymer is solely the ionic group containing material, then ethylene oxide units can be added through the chain-extender which has ethylene units in addition to being polyfunctional for reaction with isocyanate groups.

In addition to known chain-extenders being used for chain-extending, the isocyanate-containing prepolymer having the organosilane incorporated therein an isocyanate-containing prepolymer not having the organosilane incorporated into the prepolymer can be chain extended by the organosilane having at least difunctional isocyanate-reactivity. In this alternative embodiment of the present invention, the isocyanate-containing prepolymer is prepared with the polyisocyanate and the organic compound with active hydrogens with or without, but preferably with, hydrophilic additives. This prepolymer may also have any of the other additional comonomers as aforementioned and may be neutralized, if need be, because of the presence of the precursor ionic hydrophilic additive. This isocyanate-containing prepolymer is then dispersed in an aqueous medium similar to that described above for the isocyanate-containing prepolymer having the pendant silyl groups. Preferably the difunctional isocyanate reactive organosilane is used as the chain-extender in this alternative procedure, and the method of using it as a chain-extender is similar to using other chain extenders, except that the upper limit of the amount of the organosilane which can be used to chain extend the prepolymer is about 10 weight percent of the prepolymer. Amounts greater than this amount may result in gelation. Also in using the organosilane as the chain extender, the prepolymer if containing any precursor ionic hydrophilic additive, must be nearly completely neutralized to avoid unfavorable side reactions. Also the temperature must be controlled so that the transesterification or transalkoxylation reactions between the silanes and the hydroxyl groups on the isocyanate-containing prepolymer do not occur to any great extent and so that appreciable amounts of allophanates and biurets are not formed.

Whether a chain extension is accomplished with chain-extenders commonly used in preparing latices of polyurethane resins or with the difunctional isocyanate reactive organo silanes, the pH of the aqueous dispersion must be controlled to deter the formation of silane or silanol dimers and siloxane oligomers. This is accomplished by having a pH that approaches alkalinity so that the formation of siliconate anions is the preferred reaction over the reaction of silanol groups to form dimers and siloxane oligomers. Generally, when the silyl concentration on the polymer is greater than around 0.1 weight percent of the water in the aqueous dispersion, the pH for the dispersion is maintained at least around 7. If the pH is not already at this value from the types of materials in the dispersion, a pH modifier is added in an effective amount to give a pH for the dispersion of at least around 7. At this pH, a substantial number of the silyl groups on the polymer are converted to siliconate anions. With a larger concentration of silyl groups on the polymer, an increased pH may be required. For instance at silyl concentrations greater than 0.4 weight percent of the water in the aqueous dispersion, the pH should be or should be adjusted to about 8.5 or greater. At this pH, a substantial number of the silyl groups present in the increased concentration of the silyl groups are converted to siliconate anions. The result is a more stable silylated polyurethane polymer latex.

In preparing the aqueous dispersion of the silylated one-shot polyurethane polymer, silylated prepolymer or prepolymer to be silylated by chain extension, when the addition of the pH modifier is required, its addition occurs in sufficient time to limit the period of time in which the silyl groups are in contact with the water of the dispersion. This minimizes the opportunity of the silyl groups, which are converted to silanol groups when in contact with water to react to form silanol dimers and siloxane oligomers.

The addition of the pH modifier can occur at various times around the step of chain extension. After the addition of the chain-extender, whether the chain extender is a conventional chain extender for polyurethane resin or whether it is difunctional isocyanate reactive organosilane, the pH modifier must be added shortly after the addition of the chain extender. The exact time of adding the pH modifier after the chain extender is added to the aqueous emulsion of the isocyanate-containing prepolymer depends upon the relative concentrations of the prepolymer and the chain extender. The pH modifier can also be added to the aqueous dispersion of the prepolymer simultaneously with the addition of any of the chain extender. Also as with the chain extender, the pH modifier can be added to the aqueous dispersing media to which the silylated polyurethane polymer or isocyanate-containing prepolymer are added for dispersion. Any time the pH modifier is added to the aqueous dispersing medium or aqueous emulsion before the chain-extender reacts to any significant degree with the isocyanate-containing prepolymer or prepolymer to be silylated upon chain extension, the molecular weight build-up of the polymer is decreased. So the molecular weight of such a polyurethane polymer will be less than when the pH modifier was added to the aqueous dispersion of the isocyanate-containing prepolymer after the chain-extender reacts to increase the growth of the polyurethane polymer. It is preferred to add the pH modifier after the chain extender has had an opportunity to react with the isocyanate-containing prepolymer but before there is an opportunity for any significant build-up of silanol dimers, trimers and siloxane oligomers.

The pH modifier can be selected from any basic materials which can be added in effective amounts to bring the aqueous system to the desired pH. If the basic material is nucleophilic, the concentration of such a pH modifier should be limited so that there is no nucleophilic attack on the functional groups on the prepolymer or resulting chain-extended polymers. Nonexclusive examples of pH modifiers that can be used in the present invention include non-limiting examples of such basic materials as alkali metal hydroxides, alkaline earth metal hydroxides, salts of a strong or weak base including organic bases and a weak acid. For the purpose of this invention, alkaline earth metal refers to calcium, magnesium, and barium. Also, organic bases can be used such as primary, secondary, tertiary, aliphatic and aromatic amines, pyridine and pyrrole. The salt of a strong or weak base and weak acid refers to acid and basic salts that react basic to litmus or other indicators. Non-exclusive examples of these compounds include alkali metal borates, and bicarbonates, basic bismuth nitrate and basic ferric actetate.

Non-limiting examples of the above compounds include: ammonium hydroxide, sodium, potassium or calcium hydroxide, magnesium hydroxide, barium hydroxide, sodium tetra borate decahydrate, or pentahydrate, sodium metal borate tetrahydrate, sodium tetraborate, sodium carbonate, hydrates of sodium carbonate, sodium citrate and hydrates thereof, and similar compounds of potassium, lithium and ammonium, pyridine, pyrrole, 2-aminoethylpropanol, benzylamine, n-butylamine, t-butylamine, ethylamine, ethylenediamine, hexamethylene diamine, methylamine, 3-aminopentane, 3-amino-3-methyl pentone, piperazine, 1,3-diamino-propane and propylamine. The preferred pH modifier is ammonium hydroxide or an alkali metal hydroxide such as sodium hydroxide or a mixture of ammonium and sodium hydroxides.

The presence of an ionic hydrophilic additive in the silylated polyurethane one-shot polymer, or isocyanate-containing prepolymer can affect the pH of the dispersion. The total anionic content of the dispersion must be considered in adjusting the pH of the dispersion. For instance, both the silyl groups present as silanols as well as the anions such as (COO$^-$) present from the ionic hydrophilic additive must be considered. As an example, a polymer or prepolymer or chain extended polymer may have around 10 weight percent ionic hydrophilic additive and an amount of silyl groups of around 0.4 weight percent of the water in the dispersion. For this polymer, an effective amount of pH modifier must be added to obtain a pH of greater than around 8.5 to produce a stable dispersion.

The final chain extended polymer dispersed in water with a stabilizing pH should have a viscosity of about 10 to about 50,000 centipoise and preferably from about 20 to 35,000 centipoise and should have a solids content of about 20 to 80 weight percent and can be an oil-in-water type dispersion. A substantial number of the silyl groups present on the polymer exist as siliconate anions which not only stabilize the dispersion but are capable of further reaction with hydroxyl ion-containing surfaces. The dispersion should be stable and can be essentially emulsifier free. The particle size of the disperse phase at 1 percent solids is less than 10 preferably less than 5 and most preferably 1 micron or less, and the particles may be spherical or elongated. Generally, the dispersed, chain extended resin with siliconate anion groups is nongelled and has an intrinsic viscosity of less than 4.

The one-shot silylated polyurethane polymer with or without ethylene oxide-containing and/or cationic hydrophilic additives can have a substantial number of the silyl groups converted to siliconate anions without dispersing the polymer in water. The silyl groups would exist on the polymer with three or less (OR$_x$) groups from Formula (II). By adding an effective amount of an alkali metal or akaline earth metal hydride, a substantial number of the silyl groups can become siliconate anions. Once again, the siliconate anions in the polymer would be a mixture of silyl groups having mono and di siliconate anion with other positions on the silyl groups remaining as (OR$_x$) or silanol groups. Around 50 percent of the silyl groups would be converted to have some position having a siliconate anion.

The aqueous dispersion of the final chain-extended siliconate anion-containing polymer or chain extended polymer, can be used alone or with additional modifying agents as a coating composition. When additional modifying agents are added to the aqueous dispersion of silylated polyurethane, the dispersion is electrolytically stable for reasonable additional amounts of the modifying agents. Examples of such modifying agents may include processing aides, textile lubricants, wetting agents, crosslinking agents, curing agents, antistatic agents and the like. The aqueous dispersion or the one-shot polymer with siliconate anions can be used as a coating that can be applied to myriad types of substrates where the coating can interact with the substrate by covalent bonding, ionic bonding, hydrogen bonding and/or van der Waal bonding through the siliconate anion or to a limited extent available silanol groups. Nonexclusive examples of such substrates include leather, paper of fabric stock, clay coated print sheet stock, inorganic oxides such as glass, aluminum, and steel, and any other inorganic or organic solid material which possess either oxygen, chemisorbed or covalently bonded, or hydroxyl (bonded or free) at the substrates initial or exposed surface and includes any materials which can be treated by coupling agents known in the prior art. The inorganic oxide material can be in any form including particles of regular or irregular shaped such as spherical, individual fibers such as glass fibers, woven fiber mats or fabric or continuous surfaces such as sheets, films, slabs and formed shapes. Specific illustrations of suitably employed inorganic oxide materials are, for example, brass (with an oxidized surface), aluminum metal (oxidized at its surface), iron or steel (oxidized at its surface), alumina, aluminum trihydrate, siliceous materials such as fume silica, hydrated silica (precipitated silica), silica aerogels, silica xerogels, aluminum silicates, calcium, magnesium silicates, asbestos, glass fibers, clays, molecular sieves, wallostonite, calcium carbonate, carbon black (including lamp black) titanium dioxide (including titanium dioxide which contains hydrochloric soluble alumina and/or silica) calcium sulfate, magnesium sulfate, calcium carbonate containing a silica coating or agglomerated to silica and the like.

The coating composition of the present invention, which is a polymeric adhesion promoter, can be used in essentially the same manner as coupling agents known in the prior art. It is believed without limiting the invention that the mechanism by which the polymeric adhesion promoter functions is not the same as the prior art coupling agents. The polymeric adhesion promoter can be supplied to the surface of the inorganic oxide or organic material prior to contacting with any additional polymeric materials to be reinforced or augmented with the inorganic oxide or organic material. As a coating composition, additional film forming polymers may not be needed since the polyurethane having the siliconate anion groups can be an excellent film forming polymer. Also the coating composition can be applied as a primer coating to the surface of inorganic oxides in the form of the aqueous emulsion by any means such as brushing or spraying.

Other film-forming resins can be included in the compositions of this invention to modify or provide desired attributes to a cured coating. For example, conventional cross-linking agents such as aminoplast resins can be included in the coating compositions. The aminoplastic resins of most interest are the condensation products of melamine with an aldehyde, preferably formaldehyde. The melamineformaldehyde condensation product can be used, per se, or can be etherified with a lower alcohol to produce an alkylated melamineformaldehyde condensation product. When used, the aminoplast resin represents about 5 percent of the coating composition.

Coating compositions containing the ungelled reaction products and the organic solvent will optionally also contain pigments, fillers, plasticizers, anti-oxidants, flow control agents, surfactants and other conventional additives. Catalysts, in particular, are included in the compositions at a level ranging from about 0.1 percent to about 5 percent based on the ungelled reaction product and polyol. Conventional catalysts such as the tin naphthenate, tin benzoate, tin octoate, tin dioctoate, tin butyrate, dibutyl tin dilaurate, iron stearate, the tetraisopropyl titanate are used. Minor amounts of monoacrylate/aminosilane reaction products can be included in the coating compositions of this invention. The monoacrylate/aminosilane reaction products, when used in a minor amount, are capable of contributing a plasticizing or viscosity reduction effect to the composition without materially affecting the properties of film produced therefrom or, in some cases, impart more durable properties to the coating.

The compositions herein can be applied by conventional coating methods, including brushing, dipping, flow coating, roll coating, and spraying. Virtually any substrate, including wood, metals, glass and plastics can be coated with the compositions. Cure of the applied compositions can be affected by moisture (with or without heat) as described above or with a polyol as described below. Those instances where a low temperature cure is desired are most amenable to using the compositions of this invention. Thus, ambient temperature is sufficient for effecting a cure provided a cure period of up to two days can be tolerated prior to achieving a coating having its essentially fully developed properties. It should be noted, though, when cured at ambient temperatures the coating is dry to the touch after only a few hours. A more fully developed cure in the coating can be achieved by applying heat, with less than about 150° C. being sufficient.

BEST MODE OF THE INVENTION

The silylated isocyanate-containing-prepolymer is prepared in an anhydrous reaction conducted in the presence of a solvent and a catalyst. A slight nitrogen blanket is maintained during the reaction. To a clean and dry kettle reactor having an agitator there was added 47.3 Kg of the polyester diol commercially available under the trade designation "Tone 200" from Union Carbide Corporation. This material has a molecular weight of around 530 and was premelted at 180° C. Also added was 2.04 Kg of the hydrophilic ethylene oxide-containing material, which is a polyoxyethylene polyol homopolymer available under the trade designation "Carbowax 1450" material. This material is also available from Union Carbide Corporation and was also premelted at 180° C. Also added was 247.7 grams of 1,4-butane diol as the hardening segment polyol. The difunctional organosilane, N-(beta aminoethyl)-gamma aminopropyltrimethoxy silane available from Union Carbide Corporation under the trade designation "A-1122" was added through a clean pump in an amount of 917.8 grams. As a solvent n-methyl-pyrrolidone was added in an amount of 9.21 Kg. These materials were heated to 140° F. (60° C.).

Over a period of 30 minutes, while the temperature was maintained between 140° F. (60° C.) to 150° F. (66° C.), 51.67 Kg of methylene-bis-(4-cyclohexyl isocyanate) were added to the kettle reactor with agitation. This cycloaliphatic diisocyanate is available under the trade designation Desmoder W material from Mobay Chemical Company. An additional amount of 7.03 Kg of n-methyl-pyrrolidone was added to rinse the pumps and lines to the kettle. This mixture was held at 140° F. (60° C.) to 150° F. (66° C.) for 10 minutes.

The acid value was determined using acetone and phenol red indicator to be between 17.7 and 18.5.

Fifty grams of the catalyst dibutyl tin dilaurate were added. The temperature was held at 170° F.–175° F. (76.6° C.–79.4° C.) until a constant NCO equivalent of around 1045 to 1087 was obtained.

An amount of 3.04 Kg of n-methylpyrrolidone was added while cooling to 160–165° F. (71.1° C.–73.9° C.). Over 10 minutes, 4.04 Kg of triethylamine were added to neutralize the mixture. To rinse the pump and lines, an amount of 0.45 Kg of n-methyl pyrrolidone was added.

To another tank, connected through pipes with appropriate valves to the kettle reactor, an amount of 172.8 Kg of water were added and the temperature was maintained at 130° F. (54° C.). Based on the constant isocyanate (NCO) equivalent, an amount of 3.49 Kg ethylenediamine was mixed with 6.44 Kg of water in a mix vessel.

The kettle reactor containing the prepolymer was pressurized to a pressure sufficient to transfer the prepolymer to the water in the other tank. The rate of addition is that which is necessary to avoid promoting undesirable side reactions such as the reaction between water and isocyanate which would decrease the linearity of the final polymer. The temperature in the other tank during the addition of the prepolymer is maintained between 120° F.–140° F. (49° C. to 60° C.). The ethylene diamine and water mixture is added to the resin and water mixture in the other tank to cause chain extension of the prepolymer at a rate to avoid promoting the undesirable side reactions. The temperature during the addition is maintained at about 120° F. to 140° F. (49° C. to 60° C.). All of the additions to the other tank are accomplished with agitation. Water in an amount of 23.95 Kg was added to the other tank as a rinse for the conduit lines which conveyed the materials to the other tank. The amounts and types of neutralizer and chain extender used in the production of the aqueous dispersion of the chain-extended polymer gave the dispersion a pH of 9.6. Hence the use of a pH modifier was not required. The solids of the dispersion was 32.3, and the dispersion had a particle size of 0.66μ. The viscosity of the dispersion was 29,000 centipoise.

In the preferred embodiment, the aqueous dispersion of the polyurethane polymer leads to a polyurethane-polyurea polymer which has good film forming properties such as tensile, and elongation. In addition the resulting polyurethane-polyurea polymer has a requisite degree of hardness so that when the aqueous dispersion is applied to the preferred inorganic oxide surface of glass fibers, the glass fibers can be chopped in a facile manner. In producing the isocyanate-containing prepolymer, the organic compound with the active hydrogens for reaction with isocyanate is a polyester diol having a functionality of 2. Also the polyisocyanate is the difunctional, cycloaliphatic diisocyanate and the hydrophilic additives are a mixture of both poly(oxyethylene) polyol homopolymer hydrophilic additive and an ionic hydrophilic additive which is anionic having carboxyl groups and active hydrogens for reaction with isocyanates. Most preferably, the ionic hydrophilic additive can be a precursor ionic hydrophilic additive that is neutralized into the carboxyl groups. Also in their preferred embodiment, the difunctional isocyanate reactive organo silane is used as a comonomer and is essentially free of dimer or higher oligomeric forms.

In an alternative embodiment the prepolymer reaction is again an anhydrous reaction conducted in the presence of a solvent and a catalyst. The equivalent ratios of the comonomers are diisocyanate to the polyester diol in the range of about greater than one to one to In an alternative embodiment the prepolymer reaction is again an anhydrous reaction conducted in the presence of a solvent and a catalyst. The equivalent ratios of the comonomers are diisocyanate to the polyester diol in the range of about greater than one to one to about 3 to 1 and most suitably about 1.4 to one. The amount of difunctional organo silane is in the range of up to about 10 mole percent of the isocyanate reactive monomers. The prepolymer is prepared by combining the polyester diol commercially available under the trade designation "Tone 200" with the hardening polyol which is 1,4-butane diol and with the hydrophilic ethylene oxide containing additive which preferably has a molecular weight greater than 1,000 and less than 4,000. A suitable hardening polyol is available from Union Carbide Corporation under the trade designation "Carbowax 1450" material. These materials are combined with methyl ethyl ketone and added to a reaction vessel having a condenser and drying tube and stirring blade. The mixture is heated to a temperature in the range of about 70° C. to about 90° C. for a time to complete the dissolution of the materials.

The difunctional organo silane, N-(beta aminoethyl)-gamma aminopropyltrimethoxy silane, "A-1122" silane, is added slowly in increments to the mixture of polyols in the solvent. The cycloaliphatic polyisocyanate, methylene-bis-(4 cyclohexyl isocyanate) is added slowly to the mixture in the reaction vessel. This mixture is heated to a temperature in the range of about 60° C. to 90° C. for a time sufficient to assure nearly complete reaction between the organo silane and the polyisocyanate.

The ionic hydrophilic additive, which is preferably the dimethylpropionic acid (DMPA), is added to the mixture and dissolved completely. After a solution is achieved, the catalyst preferably conditions are sufficient to make this conversion and to react the components to form the prepolymer.

To test the completion of the reaction, an aliquot of the prepolymer is titrated by the standard method ASTM 309/82 to determine the isocyanate equivalent. After the isocyanate equivalent becomes consistent, usually around 1300, the prepolymer is ready for dispersing in an aqueous medium. Warm water at about 120° F. (49° C.) or higher is slowly added to the reaction vessel containing the prepolymer in about an equal amount of water for the amount of prepolymer with vigorous stirring. Immediately after the addition of water, the chain extender, preferably ethylene diamine, in a solvent, preferably water, is slowly added to the dispersed prepolymer with stirring at a temperature of about 110° F. (43° C.) to 130° F. (54° C.) for a time sufficient to react most of the chain extender to form a silylated, polyurethane-polyurea polymeric material. Shortly after the addition of the chain extender, sodium hydroxide as 28 percent solution is added in an amount to bring the pH of the aqueous dispersion to greater than about 8.5.

The following examples further illustrate the invention.

EXAMPLE 1A

This example shows a method of producing the silylated polyurethane in a two-step prepolymer process, where pH control is maintained by the components added to prepare the silylated polymer. Particularly, the basic neutralizing agent and organic basic chain extender in their particular amounts in relation to the amounts of the other components obviated the need for addition of a pH modifier.

In a round-bottomed flask (equipped with an air-driven motor stirrer, nitrogen atmosphere, and a heating mantle) was placed 344.07 g (0.65 moles) of Tone 0200; 14.50 g (0.01 mole) of Carbowax 1450; 1.80 g (0.02 mole) 1,4 Butanediol; 6.67 g (0.03 mole) of A-1122; and 66.74 g N-methylpyrrolidone, which was heated to 60° C. until completely dissolved. To this mixture was added 375.20 g (1.43 moles) of Desmodur W in 76.7 g of N-methylpyrrolidone over a 30-minute period while maintaining temperature between 60° C. to 65° C. A solid portion of 38.89 g (0.29 mole) of Dimethylolpropionic acid was added to this mixture and kept between 75° C. to 80° C. After 30 minutes the acid value should be 17.7 to 18.5. Follow reaction by an isocyanate (NCO) titration every 30 minutes. The theoretical NCO equivalent weight is 1045 to 1087 and usually takes 4 to 5 hours to be obtained. The titration procedure is based on the standard dibutyl amine method. After the reaction is complete, 29.34 (0.29 mole) of triethylamine is added over a 10-minute period. As soon as a homogeneous solution is reached, the resin is rapidly added to 1428 g of $H_2O$. As soon as the addition is complete (an emulsion of the prepolymer should be formed), the ethylenediamine is added at a rate to prevent gelation. The amount is based on the final NCO titration. For a 1080 NCO, 21.67 g of ethylenediamine would be used. This chain-extended polyurethane emulsion had the following physical properties:

Solids: 32% to 33%
pH: 10
Particle Size: 0.5 to 0.7$\mu$
Viscosity: 20,000 to 30,000 cps
Mn: 20,000 to 30,000

Table 1 displays the reactants and their amounts in the preparation of dispersion examples. In preparing the aqueous dispersions of Table I, five variations of the process were used.

In example 1 of Table 1, the process involved obtaining the polyurethane resin with the siliconate anions by adding the organo silane as a comonomer in forming the prepolymer. This procedure was conducted in the following manner. The polyester diol and the 1,4-butane diol and the poly(oxyethylene) polyol were combined with the methyl ethyl ketone solvent in a 3 litre flask which was equipped with a thermometer, condenser, drying tube, and stirring blade. The mixture was heated to 90° C. for 30 minutes or until the complete dissolution of the materials. The N-(beta amino ethyl)gamma aminopropyltrimethoxy silane was added in dropwise increments to the mixture followed by the addition of the methylene-bis-(4-cyclohexyl isocyanate). The polyisocyanate was slowly added over about 5 minutes and the mixture was heated at 90° C. for 15 minutes. The dimethylolpropionic acid (DMPA) was added to this mixture in one portion and took about 20 minutes to dissolve completely. After a solution was achieved, the dibutyltin diacetate catalyst is added and the mixture was heated to 90° C. for 4 hours with stirring. After this reaction time, the triethylamine was added at 90° C. to the solution and stirring for 15 minutes.

An aliquot of the prepolymer was titrated by the ASTM method 309/82 to determine the isocyanate equivalent, here around 2,000 to 2,100. When the Gardner Holt viscosity of Z' was reached, the prepolymer reaction was stopped. The prepolymer was then slowly added to warm water under high shear stirring. Immediately after this addition, the diethylene triamine chain extender in methyl ethyl ketone solvent is added slowly to the dispersed prepolymer. Also immediately the pH of the dispersion was adjusted with ammonium hydroxide to be greater than 9 and the material was stirred at 70° C. for 30 minutes. After the inversion point was reached, water was added to obtain a solids content of 60% or less.

For examples 2 through 6, a second procedure was used and the amounts are shown in Table 1. The polyester diol, poly(oxyethylene)polyol, 1,4-butane diol, and N-(beta-amino ethyl) gamma aminopropyl trimethoxy silane were mixed where the solid material was melted. This was performed in the presence of methyl ethyl ketone and the dibutyltin diacetate catalyst. The methylene-bis-(4-cyclohexyl) isocyanate was added and the mixture was stirred at 80° C. for 15 minutes. The DMPA was added and the mixture was heated to 90° C. for 5 hours.

For examples 9 and 10, a one-shot polyurethane formation process was used. In this procedure, the polyester diol, 1,4-butane diol, ethylene glycol, poly(oxyethylene)polyol, and N-(beta-aminoethyl)gamma aminopropyl trimethoxy silane were combined in a 12 liter flask with high shear mixing blades. The diisocyanate was added dropwise at 70–90° C. The triethyleneamine was added as a neutralizer and the combination was brought to 130° C. and held for four hours. Hot water along with 25 percent Dowanol PM were added to emulsify the resulting polymer. A modification of this procedure is to include DMPA with subsequent neutralization by a neutralizing agent.

In example 8, the procedure involved using the difunctional isocyanate reactive organo silane as the chain extender. This procedure involved combining the polyester diol, 1,4-butane diol, poly(oxyethylene) polyol in a flask with the solvent. The diisocyanate was added with the catalyst and the mixture was cooked at 130-150° C. and was stopped with 30 percent methyl ethyl propylene glycol (Dowanol PM from Dow Chemical Co.) at a Gardner Holt viscosity of S. The resulting hot prepolymer was dispersed in hot water, the N-(beta amino ethyl)-gamma aminopropyltrimethoxy silane in unhydrolyzed form was added as a chain extender.

In example 7, the procedure, for making the polyurethane having the siliconate anion groups involved using only one hydrophilic agent, which was the ethylene oxide-containing agent. This procedure differs from that of Example 1 in that the DMPA was not added and there was no neutralization with triethylamine.

As is noted from the examples in Table 1, all of the dispersions formed of the polyurethane resin were ungelled.

TABLE 1

| COMPONENTS | SAMPLES (moles/grams) | | | | |
|---|---|---|---|---|---|
| | 1 | 2 | 3 | 4 | 5 |
| Polyisocyanate (Des W) | 1.43/375.2 | 1.33/348.5 | 1.83/240.0 | 1.83/240.06 | 1.5/196.77 |
| Polyester polyol (Tone 0200) | 0.65/344.07 | 0.55/291.5 | 0.65/172.04 | 0.65/172.04 | .55/145.57 |
| 1,4-butane diol (BDO) | 0.02/1.8 | .36/32.4 | 0.24/10.81 | 0.02/0.90 | .34/15.32 |
| Poly(oxyethylene) polyol C-1450 | 0.01/14.5 | .02/29 | 0.02/14.5 | 0.01/7.25 | .02/14.5 |
| Ethylene glycol | —/— | —/— | —/— | —/— | —/— |
| Methyl ethyl ketone (MEK) | —/143.02 | —/— | —/111.2 | —/110 | —/67.05 |
| Dimethanol propionic acid (DMPA) | 0.29/38.89 | .05/6.7 | 0.06/4.02 | 0.29/19.45 | 0.05/3.35 |
| N—(beta aminoethyl)-gamma aminopropyl-triethoxysilane Substantially monomeric form- A-1122 | 0.03/6.67 | 0.2/4.44 | 0.03/3.33 | 0.02/2.22 | .04/4.44 |
| Neutralizing agent triethylamine | 0.29/29.34 | 0.05/5.05 | .12/10.68 | .145/14.65 | .07/7.52 |
| Chain extenders: | | | | | |
| Diethylene triamine | 0.19/20.0 | .175/18 | 1.47/151.9 | 0.1/10 | 0.62/63.95 |
| N(beta-aminoethyl-gamma aminopropyl-triethoxy silane (A-1122) | —/— | —/— | —/— | —/— | —/— |
| Water | /1414.6 | /1177 | /1038 | /812.8 | /762.5 |
| pH of emulsion | 9.5 | 9.5 | 9.5 | 9.5 | 9.5 |

| COMPONENTS | SAMPLES (moles/grams) | | | | |
|---|---|---|---|---|---|
| | 6 | 7 | 8 | 9 | 10 |
| Polyisocyanate (Des W) | 1.83/240.1 | 1.4/183.4 | 1.2/157.2 | 1/131.18 | 1.0/131 |
| Polyester polyol (Tone 0200) | .55/145.6 | .55/145.75 | 0.55/145.75 | .65/172.25 | .23/230 |
| 1,4-butane diol (BDO) | ,34/15.32 | .38/17.1 | —/— | .23/10.36 | .65/29.25 |
| Poly(oxyethylene) polyol C-1450 | 0.02/14.5 | .04/29 | 0.4/17.55 | .25/41.875 | .02/33.5 |
| Ethylene glycol | —/— | —/— | —/— | .05/1.55 | —/— |
| Methyl ethyl ketone (MEK) | —/74.69 | 0.04/29 | —/— | —/— | —/— |
| Dimethanol propionic acid (DMPA) | 0.05/3.35 | —/— | —/— | —/— | .05/3.35 |
| N—(beta aminoethyl)-gamma aminopropyl-trimethoxy silane Substantially monomeric form- A-1122 | 0.04/4.44 | 0.03/3.33 | —/— | .045/5.0 | .05/5.6 |
| Neutralizing agent triethyl amine | 0.175/17.67 | —/— | —/— | —/— | —/— |
| Chain extenders: | | | | | |
| Diethylene triamine | 1.35/139.2 | 0.11/11.1 | —/— | —/— | —/— |
| N(beta-aminoethyl-gamma aminopropyl-triethoxy silane (A-1122) | —/— | —/— | 0.02/2.22 | —/— | —/— |

TABLE 1-continued

| Water | /973 | /641 | /516.3 | /580 | /692 |
|---|---|---|---|---|---|
| pH of emulsion | 9.5 | 9.5 | 9.5 | 9.5 | 9.5 |

Table 2 presents performance results on a film from the aqueous dispersion of the silylated polyurethane of Example 1 in Table 1 versus a commercially available non-silylated polyurethane aqueous emulsion. The commercially available polyurethane dispersion is publicized as having the following properties:

Solids (%):62%
pH:10
Tensile (psi):5,000
Elong at break (%):550
Brookfield viscosity 23° C. 20rpm/RVF 4 spindle 4,000 cps
Film forming temperature 250-325° F. until fused
Surfactant type: anionic-nonionic The film tensile and elongation tests of Table 2 were conducted on films that were cast in trays. The films were produced by placing equal amounts of equal solid containing material in trays and air drying overnight. The trays were placed in an oven and heated at 300° F. (149° C.) for 30 minutes. Strips of 1"×5" were placed in an Instron machine with 1,000 lb (453.6 kg) load cell and a 2 inch 5.08 cm per minute cross head speed, and a jaw gap of 3 inches (7.62 cm). The elongation measurement was obtained from the tensile strength curve for the travel distance of the jaws from start to break, and elongations tests were conducted in accordance with standard ASTM test procedures. The test on the dispersion for particle size was conducted on a Coulter counter in accordance with a standard ASTM method.

The dispersion test for stability included a low shear test and a percent dilution test. For the low shear test, the dispersion is stirred at a low shear rate for around 16 hours to determine stability at the end of the time period. The 1 percent dilution test involves a known quantity of dispersion being suddenly diluted to one percent. The dilution is shaken for a period of time. If the dispersion separates in either of these tests, the emulsion fails the test.

Table 2 shows the film from the dispersion of the present invention has better tensile and elongation properties than non-silylated polyurethane. Table 2 also shows the dispersion of the present invention has a good particle size and better performance in low shear and dilution testing than the commercialy available aqueous polyurethane emulsion.

TABLE 2

| | PROPERTIES OF POLYURETHANE FILM AND EMULSION | | | | |
|---|---|---|---|---|---|
| | TENSILE (psi) At Break | ELONGATION (%) At Break | PARTICLE SIZE ($\mu$) | LOW SHEAR | % DILUTION |
| Film of Eg. 1 | 3121 | 710 | 1-2 | Pass | Pass |
| Film from commercially-available polyurethane emulsion | 2975 | 650 | 2.5-4.0 | Fail | Fail |

We claim:

1. Water dispersible, ungelled, silylated material comprising the polyerized reaction product of:
   (a) organic polyisocyanate,
   (b) active hydrogen-containing material having at least two active hydrogens per molecule,
   (c) organosilane having at least one isocyanate reactable group on one organic moiety of the silane and having at least one alkoxy, acyloxy, or hydroxy group bonded to the silicon atom, wherein, said organic polyisocyanate and said reactive hydrogen-containing material are predominantly difunctional in the isocyanate polyaddition reaction, and where the polymerized reaction product is formed at a temperature less than 200° C. and in a substantially anhydrous medium and where the reaction product has a substantial number of siliconate anions selected from the group consisting of, [SiO−], [SiO=], [SiO₃=], and mixtures thereof.

2. Water dispersible, ungelled, silylated material comprising the polymerized reaction products of
   (a) organic polyisocyanate,
   (b) active hydrogen-containing material having at least two active hydrogens per molecule,
   (c) organosilane having at least one isocyanate reactable groups on one organic moiety of the silane and having at least one alkoxy, acyloxy or hydroxy group associated with the silicon atom,
   (d) hydrophilic additives selected from the group consisting of polyethers with a predominant amount of ethylene oxide moities, polyoxyethylene homopolymer and monofunctional polyethers and polyether polyols and active hydrogen containing organic compounds having one or two active hydrogens per molecule and having ionic groups or precursor ionic groups, wherein, said organic polyisocyanate and said reactive hydrogen-containing material are predominantly difunctional in the isocyanate polyaddition reaction, and where any ionic or precursor ionic hydrophilic additive is added only after the organo silane and polyisocyanate have reacted to a substantial degree and where the polymerized reaction product is formed at a temperature less than 200° C. and in a substantially anhydrous medium.

3. Reaction product of claim 2, wherein the monofunctional polyethers are selected from diisocyanates which contain lateral, hydrophilic ethylene oxide units, and organic compounds which are difunctional in the isocyanate-polyaddition reaction and contain lateral hydrophilic ethylene oxide units, monoisocyanates which contain terminal, hydrophilic ethylene oxide units, organic compounds which are monofunctional in the isocyanate-polyaddition reaction, and that have terminal hydrophilic ethylene oxide units and mixtures of these materials.

4. Reaction product of claim 2, which has an additional monomer which is a low molecular weight active hydrogen-containing compound having at least 2 active hydrogen per molecule and which constitutes at least 20 percent of the polymerized reaction product.

5. Reaction product of claim 2, wherein the ionic groups are selected from the group consisting of cationic groups, anionic groups, or mixtures thereof.

6. Reaction product of claim 2, wherein the hydrophilic agent is comprised of a polyoxyethylene polyol homopolymer and a divalent organic compound having anionic groups and the ratio of the ethylene oxide-containing hydrophilic agent to the anionic group-containing agent is such that the anionic-containing organic compound constitutes the major amount while the ethylene oxide-containing compound constitutes the minor amount.

7. Reaction product of claim 2, wherein the total amount of hydrophilic agent is at least around 3 weight percent and not greater than about 10 weight percent.

8. Reaction product of claim 2, wherein the difunctional isocyanate-reactive organo silanes have organic moieties having functionalities which react with the isocyanate where these functionalities are selected from the group consisting of hydroxyl; mercaptan; primary, or secondary amine; and ureido.

9. Reaction product of claim 8, wherein the difunctional isocyanate reactive organo silane has saturated organic moieties.

10. Reaction product of claim 8, wherein the difunctional isocyanate-reactable organo silane reactant has the formula:

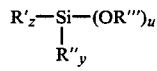

wherein u is equal to $4-(y+z)$ and wherein y and z are integers so that y is equal to 0 or 1 and z is equal to 1 or 2 and where R" and R' are organic moieties having 1 to 20 carbon atoms including alkyls having 1 to 6 carbon atoms and aryls, alkylaryls where when y is 0 or when R" is devoid of an isocyanate-reactable group, R' has at least two isocyanate-reactable groups, and where, when y=1 and R" has one isocyanate-reactable group, then R' has one isocyanate-reactable group, where (OR''') is the hydrolyzable or hydrolyzed group such as alkoxy, acyloxy, hydroxy, and the like and R''' is methyl, ethyl, n-propyl or hydrogen.

11. Reaction product of claim 2, wherein the ogranic polyisocyanate is a cycloaliphatic diisocyanate.

12. Reaction product of claim 2, wherein the organic compound with difunctional active hydrogens is a polyester diol.

13. Reaction product of claim 2, wherein the polyoxyethylene polyol homopolymer has a molecular weight in the range of about 1,000 to about 4,000.

14. Reaction product of claim 2, where the organo diisocyanate is an excess amount to the organic compound with active hydrogens to produce a prepolymer capable of chain extension.

15. Reaction product of claim 2 which includes water in sufficient amounts to form an oil-in-water dispersion and where the pH is at least around 7 when the silyl concentration on the polymer is greater than around 0.1 weight percent of the water in the dispersion so that a substantial portion of the silyl groups in the polymer are present as siliconate anions.

16. Reaction product of claim 15, where a pH modifier is present in an effective amount to give a pH for the aqueous dispersion of at least around 7.

17. Reaction product of claim 16, wherein the pH modifier is present in an effective amount to give a pH of at least around 8.5.

18. Reaction product of claim 1, wherein the organosilane has at least two isocyanate reactable groups.

19. An aqueous dispersion of ungelled, silylated material comprising the polymerized reaction product of:
   a. isocyanate-containing polymer with the pendant silyl groups derived from polymerization of reactants comprising:
      1. organic polyisocyanates,
      2. active hydrogen-containing material having at least two active hydrogens per molecule,
      3. organosilane having at least one isocyanate-reactable group on one or more organic moieties of the organo silane and having at least one hydrolyzed or hydrolyzable group associated with the silicon atom,
   b. one or more emulsifiers with an effective HLB and in an effective amount to disperse the polymer in water,
   c. water in an effective amount to form an oil-in-water dispersion of the isocyanate-cortaining polymer, and
   d. where the dispersion has a pH of at least around 7 when the silyl concentration is greater than around 0.1 weight percent of the water in the dispersion so that a substantial amount of the silyl groups in the polymer are present as siliconate anions to deter formation of the siloxanes, and wherein a predominant amount of said organic polyisocyanate and of said organic compound with at least two reactive hydrogens per molecule are difunctional in the isocyanate-polyaddition reaction, and wherein the organosilane is present as a comonomer in forming the polymer or as the chain-extender, where the polymer is a prepolymer.

20. Aqueous dispersion of claim 19, wherein the organosilane has at least two isocyanate-reactable groups.

21. Aqueous dispersion of claim 19, wherein the external emulsifier is a hydrophilic additive selected from the group consisting of polyether having ethylene oxide moieties, polyoxyethylene polyol homopolymers, monofunctional polyethers, monofunctional polyether polyols, diisocyanate having lateral hydrophilic ethylene oxide units, organic compounds which are difunctional in the isocyanate polyaddition reaction and contain lateral hydrophilic ethylene oxide units, monoisocyanate which contain terminal, hydrophilic ethylene oxide units, compounds which are monofunctional in the isocyanate polyaddition reaction and contain terminal hydrophilic ethylene oxide units, organic compounds having at least two active hydrogens per molecule having ionic groups and mixtures thereof.

22. Aqueous dispersion of claim 19, wherein a pH modifier is present in an effective amount to give a pH of at least around 7.

23. Aqueous dispersion of claim 19, wherein the pH modifier is present in an effective amount to give a pH of at least around 8.5.

24. An Aqueous dispersion of ungelled, hydrophilic, silylated material comprising the reaction product of:
   a. isocyanate-containing prepolymer formed from:
      1. organic polyisocyanate, 2. active hydrogen-containing material having at least two active hydrogens per molecule,
3. hydrophilic additives selected from the group consisting of polyethers having a predominant amount of ethylene oxide moieties, polyoxyethylene polyol homopolymers, monofunctional polyethers, monofunctional polyether polyols, diisocyanates having lateral hydrophilic ethylene oxide units, organic compounds which are difunctional in the isocyanate polyaddition reaction and contain lateral hydrophilic ethylene oxide units, monoisocyanates which contain terminal, hydrophilic ethylene oxide units, compounds which are monofunctional in the isocyanate polyaddition reaction and contain terminal hydrophilic ethylene oxide units, organic compounds having at least two active hydrogens per molecule having ionic or precursor ionic groups and mixtures thereof, and
4. at least one organosilane having at least one isocyanate-reactable group on one or more organic moieties of the organo silane and having at least one hydrolyzed or hydrolyzable group associated with the silicon atom, wherein any ionic or precursor ionic hydrophilic additive is added after the organosilane and polyisocyanate have reacted to a substantial degree, b. neutralizing agent in an effective amount to neutralize a substantial amount of precursor ionic groups of the hydrophilic agent into ionic groups,
c. water in a sufficient amount to form an oil-in-water dispersion of the isocyanate-containing prepolymer,
d. chain-extender in an amount to react with a substantial number of the isocyanate groups on the isocyanate-containing prepolymer,
e. wherein the pH of the dispersion is at least around 7, when the silyl concentration on the polymer is greater than around 0.1 weight percent of the water in the dispersion of the isocyanate-containing prepolymer so a substantial portion of the silyl groups in the prepolymer or the chain-extended polymer are present as siliconate anions, and wherein said organic polyisocyanate and said organic compound with at least two reactive hydrogens per molecule are predominantly difunctional in the isocyanate-polyaddition reaction, and wherein the organo silane is present as a comonomer in forming the prepolymer or as the chain-extender.

25. Composition of claim 24, wherein the monofunctional polyethers are selected from diisocyanates which contain lateral, hydrophilic ethylene oxide units, and organic compounds which are difunctional in the isocyanate-polyaddition reaction and contain lateral, hydrophilic, ethylene oxide units, monoisocyanates which contain terminal, hydrophilic, ethylene oxide units, organic compounds which are monofunctional in the isocyanate-polyaddition reaction and that have terminal, hydrophilic, ethylene oxide units and mixtures of these materials.

26. Composition of claim 24, which has an additional monomer which is a low molecular weight, active hydrogen-containing compound having at least 2 active hydrogens per molecule and which constitutes at least 20 percent by weight of the prepolymer based on the total weight of the prepolymer reactants.

27. Composition of claim 24, wherein the ionic groups are selected from the group consisting of cationic groups, anionic groups, or mixtures thereof.

28. Composition of claim 24, wherein the hydrophilic agent is comprised of a polyoxyethylene polyol homopolymer and a divalent organic compound having anionic groups and the ratio of the ethylene oxide-containing hydrophilic agent to the anionic group containing agent is such that the anionic containing organic compound constitutes the major amount while the ethylene oxide-containing compound constitutes the minor amount.

29. Composition of claim 24, wherein the total amount of hydrophilic agent is at least around 3 weight percent and not greater than about 10 weight percent.

30. Composition of claim 24, wherein the isocyanate reactive organo silanes having functionalities on the organic moiety which react with the isocyanate and which are selected from the group consisting of hydroxyl, mercaptan, primary, secondary or tertiary amine and ureido.

31. Composition of claim 30, wherein the difunctional isocyanate-reactable organo silane reactant has the formula:

$$R'_z\!-\!\underset{\underset{R''_y}{|}}{Si}\!-\!(OR''')_u$$

wherein u is equal to $4-(y+z)$ and wherein y and z are integers so that y is equal to 0 or 1 and z is equal to 1 or 2 and where R' and R'' are organic moieties having 1 to 20 carbon atoms including alkyls having 1 to 6 carbons atoms and aryls, alkylaryls and arylalkyls where, when y is 0 or when R'' is devoid of an isocyanate-reactable group, R' has at least two isocyanate-reactable groups, and where, when y=1 and R'' has one isocyanate-reactable group, then R' has one isocyanate-reactable group, and z is equal to 1 or 2, and where one or both of $R''_y$ and $R'_z$ organic moieties having one isocyanate reactable group or where $R'_z$ has one or two or more where (OR''') is the hydrolyzable or hydrolyzed group such as alkoxy, acyloxy, hydroxy, and the like and R''' is methyl, ethyl, n-propyl or hydrogen.

32. Composition of claim 30, wherein the difunctional isocyanate reative organo silane has a saturated organic moiety.

33. Composition of claim 24, wherein the polyurethane is a cycloaliphatic diisocyanate.

34. Composition of claim 24, wherein the organic compound with difunctional active hydrogens is a polyester diol.

35. Composition of claim 24, wherein the polyoxyethylene polyol homopolymer has a molecular weight in the range of about 1,000 to about 4,000.

36. Composition of claim 24, wherein a pH modifier is present in an effective amount to give the dispersion a pH of around 7, when the silyl concentration on the polymer is greater than around 0.1 weight percent of the water in the dispersion selected from the group consisting of ammonium hydroxide, alkali metal hydroxides, and alkaline earth metal hydroxides and mixtures thereof.

* * * * *